United States Patent [19]
Kiko

[11] 3,989,906
[45] Nov. 2, 1976

[54] REPEATER FOR TRANSMISSION LINES

[75] Inventor: Frederick J. Kiko, Sheffield Village, Ohio

[73] Assignee: Lorain Products Corporation, Lorain, Ohio

[22] Filed: Mar. 20, 1975

[21] Appl. No.: 560,258

[52] U.S. Cl............................ 179/170 R; 179/16 F
[51] Int. Cl.² .......................................... H04B 3/36
[58] Field of Search............ 179/170 R, 16 F, 170 T

[56] References Cited
UNITED STATES PATENTS

| | | | |
|---|---|---|---|
| 3,706,862 | 12/1972 | Chambers, Jr. ................... | 179/170 R |
| 3,731,012 | 5/1973 | Shaffer............................. | 179/175.3 |
| 3,781,481 | 12/1973 | Shaffer et al..................... | 179/170 R |
| 3,818,151 | 6/1974 | Chambers, Jr. et al.......... | 179/170 R |
| 3,851,108 | 11/1974 | Freimanis ........................ | 179/170 G |
| 3,903,378 | 9/1975 | Lee et al.......................... | 179/170 R |

Primary Examiner—William C. Cooper
Assistant Examiner—Randall P. Myers
Attorney, Agent, or Firm—Edward C. Jason

[57] ABSTRACT

A circuit for varying the amplification afforded to a-c signals transmitted through a transmission line in accordance with the length of that transmission line. Circuitry is provided which establishes a control signal which is a function of the a-c losses of the transmission line. This control signal is applied to an amplifying network which varies the amplification of signals transmitted through the transmission line in accordance with the magnitude of that control signal, and thereby automatically adjusts the repeater for operation with any transmission line to which it is connected.

14 Claims, 10 Drawing Figures

REPEATER FOR TRANSMISSION LINES

BACKGROUND OF THE INVENTION

The present invention relates to circuitry for amplifying signals transmitted through a transmission line and is directed more particularly to circuitry which automatically varies the amplification afforded to signals transmitted through a transmission line in accordance with the a-c losses of that line.

In communication systems wherein a-c signals are transmitted through transmission lines, it is often necessary to provide circuitry which compensates for the attenuation of those signals on transmission through the lines. In telephone systems, for example, it is necessary to provide amplifier circuits, or repeaters, to maintain satisfactory signal transmission through transmission lines which, in the absence of such circuits, would excessively attenuate the signals transmitted therethrough.

In some telephone systems it is necessary to compensate for frequency dependent losses, e.g., the frequency dependent attenuation of signals in a non-loaded transmission line. In these systems, a repeater provides a frequency dependent gain which combines with the frequency dependent attenuation of the transmission line so that the overall response of the system including the repeater and the transmission line is relatively flat over the voice frequency band. One such repeater is shown and described in U.S. Pat. No. 3,818,151 granted in the name of C. W. Chambers, Jr. et al. on June 18, 1974.

In other telephone systems, it is necessary to compensate for losses that are independent of frequency, e.g., the attenuation of signals in a loaded transmission line. In these systems, a repeater provides a relatively fixed gain over the voice frequency band. As a result, when the fixed gain repeater is connected to the transmission line, the system including the repeater and the transmission line decreases the attenuation of signals transmitted therethrough while retaining the desirable response characteristics of the transmission line. One such repeater is shown and described in U.S. Pat. No. 3,706,862 granted in the name of C. W. Chambers, Jr. on Dec. 19, 1972.

Due to the relatively high cost of purchasing and operating a separate repeater for each transmission line, it has been found desirable to operate repeaters in a common mode configuration, i.e., switch a relatively small number of repeaters among a relatively large number of occasionally used transmission lines. Such common mode systems may be of the type in which a repeater providing a frequency dependent gain is switched among several non-loaded transmission lines or may be of the type in which a repeater providing a fixed or frequency independent gain is switched among several loaded transmission lines.

A problem with switching a repeater which provides a frequency dependent gain among several non-loaded transmission lines is that the frequency dependent attenuation characteristic of a non-loaded transmission line varies as a function of the length of that line. As a result, a repeater which establishes a flat system response for a particular length of transmission line will be unable to establish a flat system response for a different length of transmission line. In order to overcome this problem, non-loaded transmission lines of similar gauges and lengths may be grouped together in a common mode configuration for servicing by a single frequency compensating repeater which is operable with any member of the group. Prior to the present invention, however, non-loaded transmission lines of differing lengths could not be grouped together in this manner even if they were of similar gauges.

A problem with switching a fixed gain repeater among several loaded transmission lines is that the attenuation of a loaded transmission line varies in proportion to the length of that line. As a result, a given repeater may establish a desirable system response (e.g., 6 db system loss) for a particular length of transmission line, but will be unable to establish that same level of system loss for a different length of transmission line. In order to overcome this problem, it has been the practice to group together in a common mode configuration loaded transmission lines of similar gauges and lengths and to utilize therewith a fixed gain repeater which is operable with any member of the group. Prior to the present invention, loaded transmission lines of differing lengths and gauges could not be grouped together and utilized in the common mode configuration, particularly if one or more of those lines was serviced by a d-c voltage boosting device commonly known as a loop extender. The most nearly satisfactory circuit of this type is shown and described in U.S. Pat. No. 3,851,108 granted in the name of Laimons Freimans on Nov. 26, 1974.

In accordance with a first embodiment of the present invention, there is provided circuitry which automatically varies the frequency dependent gain characteristics of a repeater in order to establish a flat system response for transmission lines of differing lengths, i.e., lines having differing frequency dependent attenuation characteristics. Similarly, in accordance with a second and a third embodiment of the present invention, there is provided circuitry which automatically varies the frequency independent gain of a repeater in order to establish substantially the same system loss for transmission lines of differing lengths and gauges.

SUMMARY OF THE INVENTION

It is an object of the invention to provide improved circuitry for compensating for the attenuation of a-c signals on transmission through a transmission line.

Another object of the invention is to provide repeater circuitry of the type having a frequency dependent gain in which the frequency dependent gain varies automatically as a function of the a-c losses of a transmission line so that a relatively flat system response is maintained.

It is still another object of the invention to provide repeater circuitry of the type having a frequency independent gain in which the frequency independent gain varies automatically as a function of the a-c losses of a transmission line so that a predetermined level of system loss is maintained.

A further object of the invention is to provide repeater circuitry including improved circuitry for establishing a control signal which varies in accordance with the a-c losses of a transmission line and improved circuitry for varying the gain of the repeater in accordance with the magnitude of that control signal.

Another object of the invention is to provide circuitry for establishing a control signal having a magnitude which accurately indicates the a-c losses of a transmission line.

Still another object of the invention is to provide circuitry of the above type which generates a control signal proportional to the a-c losses of a transmission line by establishing a control signal proportional to the d-c resistance of that transmission line.

Yet another object of the present invention is to provide circuitry which generates a signal proportional to the d-c resistance of a transmission line by electronically dividing the magnitude of the instantaneous voltage across the transmission line by the magnitude of the instantaneous current through the transmission line.

A further object of the invention is to provide circuitry of the above character including an improved four-quadrant analog divider network.

It is another object of the invention to provide a repeater of the above character including circuitry which senses the magnitude of the current through the transmission line by sensing the magnitude of the magnetic flux produced by that current.

It is another object of the invention to provide circuitry which varies the gain of a repeater by varying an impedance in accordance with the magnitude of a control signal.

A further object of the invention is to provide circuitry which varies the gain of a repeater by varying the output impedance of a buffer network in accordance with the magnitude of a control signal.

DESCRIPTION OF THE INVENTION

Figure 1:
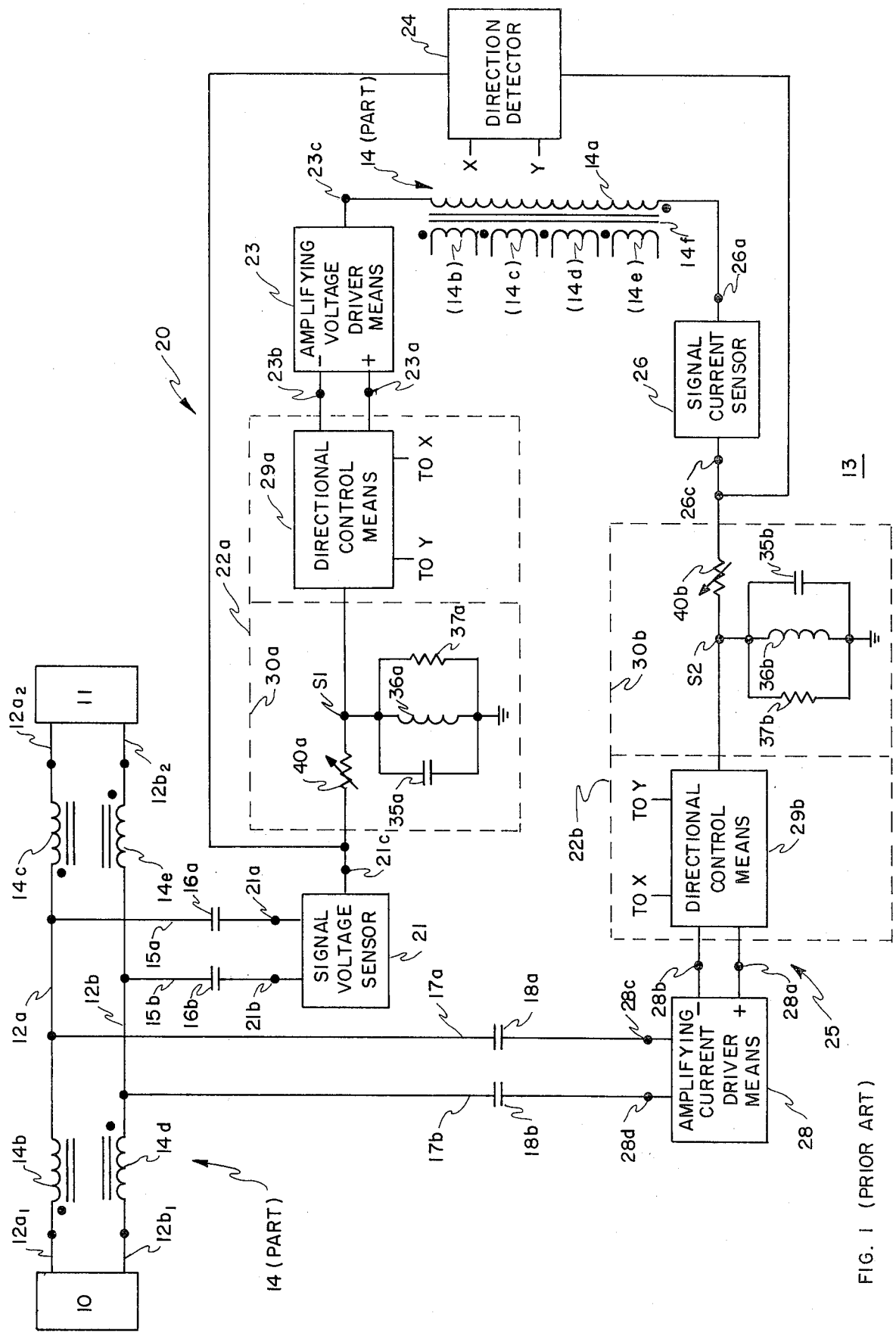
FIG. 1 is a combined block-schematic diagram which illustrates a repeater known to the art.

In the development of circuitry for transmitting voice frequency signals over transmission lines, a variety of repeater type circuits have been employed. One of these repeater type circuits is a repeater having a series amplifying network for inserting, in series with the transmission line, an amplifying voltage which varies in accordance with the signal voltage across the transmission line and a shunt amplifying network for inserting, in shunt with the transmission line, an amplifying current which varies in accordance with the signal current through the transmission line. In such circuits, it may be shown that if the ratio of amplifying voltage to signal voltage is equal in magnitude but opposite in sign to the ratio of amplifying current to signal current, the circuit may function as an impedance matching circuit. It may also be shown that if the above ratios are equal in magnitude and have the same sign, then the circuit may function as a repeater which compensates for the frequency dependent attenuation of loaded transmission lines or the frequency independent attenuation of non-loaded transmission lines. Repeater type circuits of these types will hereinafter be referred to as amplifying type repeaters.

Another of these repeater type circuits is a repeater having impedance simulating networks which provide gain by simulating the presence of negative resistances (or impedances) in series and/or in shunt with the transmission line. These impedance simulating networks may also be utilized to simulate the presence of positive impedances and thereby serve as a line-build-out network or attenuator pad. Circuits of either of these types will hereinafter be referred to as impedance simulating type circuits.

In accordance with a first embodiment of the invention, there is provided circuitry which automatically varies the frequency dependent gain of an amplifying type repeater, in accordance with the a-c losses of a loaded transmission line, to establish a flat system response for transmission lines of differing lengths. In accordance with a second embodiment of the invention, there is provided circuitry which automatically varies the frequency independent gain of an amplifying type repeater, in accordance with the a-c losses of a non-loaded transmission line, to establish a substantially constant system loss for transmission lines of differing lengths. In accordance with a third embodiment of the invention, there is provided circuitry which automatically varies the positive or negative impedances established by an impedance simulating type circuit, in accordance with the a-c losses of the transmission line, to establish a substantially constant system loss for transmission lines of differing lengths.

Amplifying Type Repeater Having Frequency Dependent Gain

As previously mentioned, amplifying type repeaters may be used to modify the impedance of a transmission line or to compensate for either the frequency dependent attenuation of non-loaded transmission lines or the frequency independent attenuation of loaded transmission lines. The amplifying type repeater 13 shown in FIG. 1, for example, compensates for the frequency dependent attenuation of a non-loaded transmission line by establishing a frequency dependent gain which combines with the frequency dependent attenuation of the transmission line, causing the response of the system including the transmission line and the repeater to be relatively flat over the voice frequency band. Circuitry of the above character is shown and described, in detail, in the U.S. patent of Charles W. Chambers, Jr. et al., Pat. No. 3,818,151, entitled "Method And Apparatus For Amplifying Signal Transmission Through Transmission Lines", the disclosure of which patent is hereby expressly incorporated herein by reference.

Due to the differing distributed capacitances of non-loaded transmission lines of differing lengths, however, the frequency dependent gain provided by a repeater of the type shown in FIG. 1, although sufficient to establish a flat system response for a particular length of transmission line, will not establish a flat system response for a different length of transmission line. This is because the attenuation of a relatively high frequency components of a voice signal increases more rapidly with an increase in the length of the line than does the attenuation of the relatively low frequency components thereof.

One embodiment of the present invention comprises an amplifying type repeater having a frequency dependent gain characteristic which is adjusted automatically in accordance with the a-c losses of the transmission line. This allows the repeater to adjust itself for operation with transmission lines of a variety of lengths and guages. As a result, the repeater can be installed without manual, on-site adjustments and can also be used in the previously described common mode systems.

In order to facilitate an understanding of the operation of the circuit of the present invention, the operation of the manually adjustable repeater 13 shown in FIG. 1 will now be briefly described. Repeater 13 is connected between a transmitting-receiving station 10 and a transmitting-receiving station 11 to amplify signals transmitted between stations 10 and 11 through the conductor pairs $12a_1$-$12b_1$ and $12a_2$-$12b_2$ of a two-wire transmission line. Station 10 may, for example, comprise a telephone set which is connected, through the conductors of a two-wire telephone line, to a similar telephone set at station 11.

Repeater 13 includes an amplifying voltage generating network 20, an amplifying current generating network 25, a direction detector 24, a coupling transformer 14 having a primary winding 14a and secondary windings 14b, 14c, 14d and 14e which are wound on a common core 14f, and coupling capacitors 16a, 16b, 18a and 18b. Amplifying voltage generator 20 senses the signal voltage across the transmission line through capacitors 16a and 16b and introduces an amplifying voltage in series with the transmission line through transformer 14. Direction detector 24 assures that the phase relationship between this amplifying voltage and the signal voltage is such that the amplifying voltage assumes a series-aiding relationship with the signal voltage transmitted by the then dominant or louder-talking party, for both directions of transmission through the transmission line. Amplifying current generator 25 senses the signal current in the transmission line through transformer 14 and introduces into the line two equal and opposite amplifying currents through capacitors 18a and 18b. Direction detector 24 assures that the phase relationships between these amplifying currents and the signal current are such that the amplifying currents assume a series-aiding relationship with the signal current transmitted by the then dominant or louder-talking party, for both directions of transmission through the transmission line. Thus, amplifying voltage generator 20, amplifying current generator 25 and direction detector 24, cooperate to introduce into the transmission line amplifying voltages and currents which aid the signal voltages and currents transmitted by the dominant party.

For purposes of description, the ratio of the sum of the amplifying voltages across windings 14b-14e to the signal voltage across the transmission line will be referred to as the series gain. Similarly, the ratio of the amplifying current generated by current generating means 25 to the average value of the signal currents in conductors $12a_1$-$12a_2$ will hereinafter be referred to as the shunt gain. Based on these definitions, the overall or insertion gain provided by repeater 13 is a function of the series gain provided by voltage generating means 20 and of the shunt gain provided by current generating means 25, respectively. It will, therefore, be seen that a circuit which exhibits a frequency dependent series gain or a frequency dependent shunt gain, or both, will exhibit a frequency dependent insertion gain.

As described in U.S. Pat. No. 3,818,151, voltage generator 20 includes a signal voltage sensor 21 having input terminals 21a and 21b and an output terminal 21c, a series gain-frequency control network 22a, and an amplifying voltage driver network 23 having a non-inverting input terminal 23a, an inverting input terminal 23b, and an output terminal 23c. Gain-frequency control network 22a serves to vary the magnitude of the amplifying voltage, as a function of frequency, for any given magnitude of signal voltage across the transmission line. In this manner, network 22a causes the series gain to vary as a function of frequency. Typically, network 22a will cause the series gain to be higher for the higher frequency components of the transmitted signal and lower for the lower frequency components of that signal.

Similarly, current generator 25 includes a signal current sensor 26 having an input terminal 26a and an output terminal 26c, a shunt gain-frequency control network 22b, and amplifying current driver network 28 having a non-inverting input 28a, an inverting input 28b, and complementary output terminals 28c and 28d. Gain-frequency control network 22b serves to vary the magnitude of the amplifying current, as a function of frequency, for any given value of signal current through the transmission line. In this manner, network 22b causes the shunt gain of the circuit of FIG. 1 to vary as a function of frequency. Typically, network 22b will cause the shunt gain to be higher for the higher frequency components of the transmitted signal and lower for the lower frequency components thereof.

As will be described more fully presently, the variations in series gain as a function of frequency and the variations in shunt gain as a function of frequency are such that, together, these variations provide a frequency dependent insertion gain for the repeater which combines with the frequency dependent attenuation of the line to provide a relatively flat repeater-line line system response over the voice-frequency band. This flat system response is maintained, in the presence of reversals in the dominant direction of signal transmission, because network 22a is located in the signal path between sensor 21 and driver 23 for both of the conductive states which direction detector 24 establishes in series directional control network 29a. This is also because network 22b is located in the signal path between sensor 26 and driver 28 for both of the conductive states which direction detector 24 establishes in shunt directional control network 29b. The operation of these direction detecting and directional control networks is described, in detail, in U.S. Pat. no. 3,706,862, entitled "Amplifier Circuit For Transmission Lines".

To the end that gain-frequency control network 22a may perform the above-described function, there is provided therein frequency compensating circuit 30a comprising resistors 37a and 40a and a tank circuit including a capacitor 35a and an inductor 36a. Capacitor 35a, inductor 36a, and resistor 37a, taken together, and resistor 40a, comprise respective sections of a voltage divider network having its ends connected between sensor output 21c and ground and having a tap S1 connected to voltage driver 23 through network 29a. Assuming that capacitor 35a and inductor 36a are selected to be resonant at a frequency substantially equal to the highest frequency in the band of frequencies to be transmitted, the percentage of the total voltage divider impedance which appears between ground and tap S1 will be relatively high when the frequency of the voltage at sensor output 21c is relatively high and will be relatively low when the frequency of the voltage at sensor output 21c is relatively low. As a result, the series gain provided by amplifying voltage generating means 20 is relatively low for those components of a signal which are least strongly attenuated by a non-loaded transmission line, i.e., the relatively low frequency components, and is relatively high for those components of a signal which are most strongly attenuated by a non-loaded transmission line, i.e., the relatively high frequency components. Thus, frequency compensating circuit 30a establishes a frequency dependent series gain which contributes to compensating for the frequency dependent attenuated characteristic of a non-loaded transmission line.

As described in the aforementioned U.S. Pat. No. 3,818,151, the amplitude and shape of the frequency dependent series gain provided by voltage generating network 20 may be manually adjusted by manually adjusting resistor 37a or resistor 40a, or both. By this adjustment, the circuit of FIG. 1 may be made to accommodate the attenuation characteristics of transmission lines having a variety of characteristics. Similarly the amplitude and shape of the frequency dependent shunt gain provided by current generating network 25 may be manually adjusted via resistors 37b and 40b so as to accommodate transmission lines having a variety of characteristics. Thus, by properly adjusting all resistors, the frequency dependent gain of repeater 13 may be shaped, as required, to compensate for the frequency dependent attenuation characteristics of a variety of transmission lines.

In accordance with one embodiment of the invention, there is provided circuitry for automatically varying the series gain and the shunt gain of an amplifying repeater of the type shown in FIG. 1, in accordance with the a-c losses of the transmission line, and thereby establishing frequency dependent insertion gains which compensate for the attenuations of transmission lines having differing frequency dependent attenuation characteristics.

Figure 2:
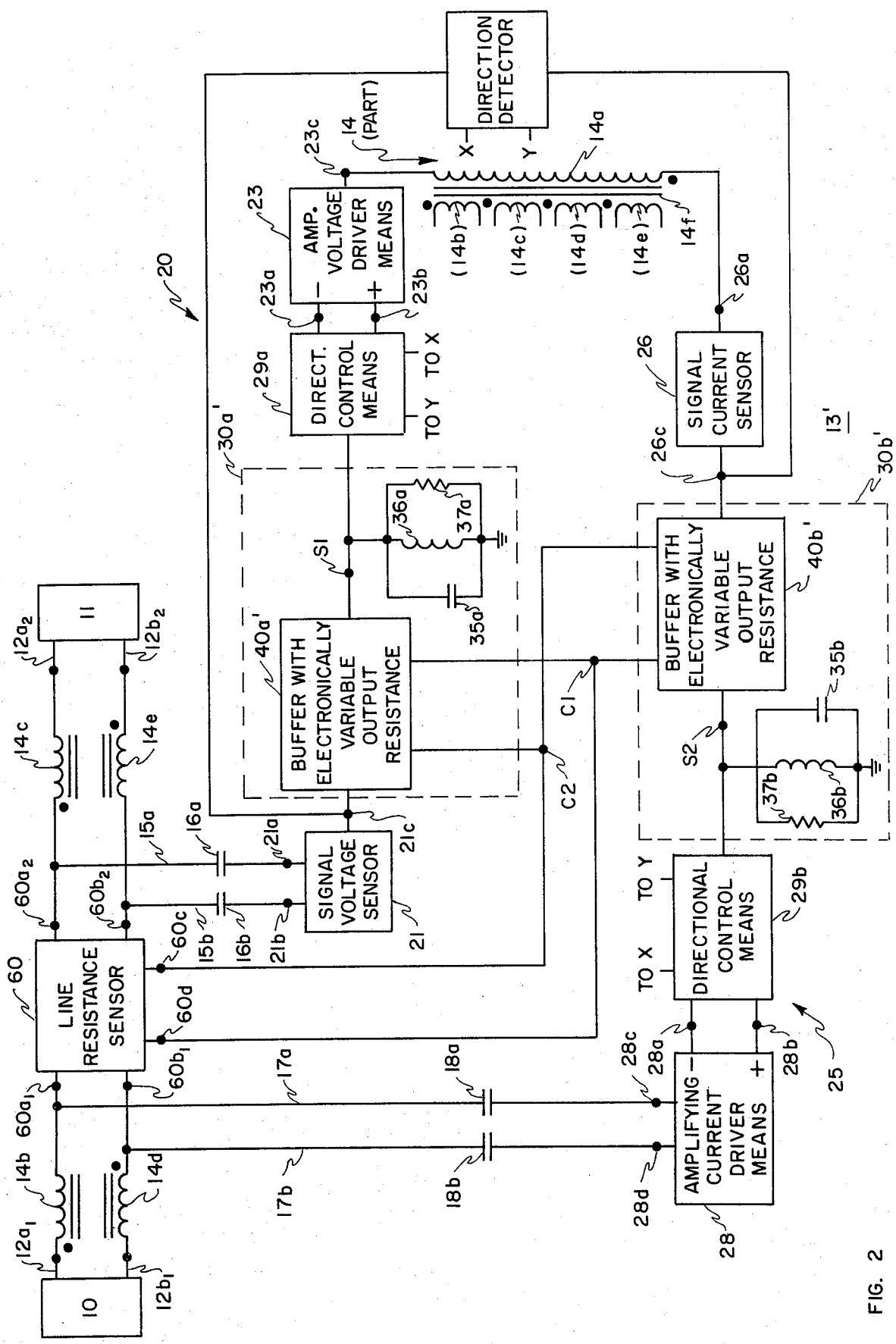
FIG. 2 is a combined block-schematic diagram which illustrates one embodiment of the circuitry of the invention.

Referring to FIG. 2, there is shown a block diagram of an amplifying type repeater 13' which is constructed in accordance with the invention. Repeater 13' is similar in many respects to repeater 13 of FIG. 1 and corresponding elements are similarly numbered. The repeater circuit of FIG. 2 differs from that of FIG. 1 primarily in that the repeater circuit of FIG. 2 includes gain control circuitry which allows repeater 13' to automatically adjust itself for operation with a variety of transmission lines. In the present, illustrative embodiment, this gain control circuitry includes a line resistance sensor 60, a series line resistance responsive network 30a' to and a shunt line resistance responsive network 30b'.

Line resistance sensor 60 serves to generate a control voltage which is proportional to the d-c resistance of the transmission line and, therefore, proportional to the a-c losses thereof. More particularly, network 60 senses the instantaneous voltage across and the instantaneous current through the transmission line and electronically divides them to establish, between terminals C1 and C2, a voltage proportional to the impedance of the transmission line. It will be understood that since the magnitudes of the d-c voltages and currents in a telephone line are ordinarily substantially greater than the magnitudes of the a-c signal voltages and currents therein, the voltages and currents sensed by network 60 are approximately equal to the d-c voltages and currents therein. Thus, even though instantaneous voltages and currents are sensed, the control voltage established by sensor 60 is proportional to the d-c resistance of the transmission line and, therefore, to the a-c losses thereof.

Line resistance responsive networks 30a' and 30b' serve to utilize the control voltage generated by sensor 60 to vary the frequency dependent series gain of voltage generating means 20 and the frequency dependent shunt gain of current generating means 25 in accordance with the d-c resistance of the transmission line. These variations, in turn, cause the insertion gain provided by the repeater of FIG. 2 to vary as a function of the d-c resistance of a transmission line and thereby allow that repeater to operate in common mode systems or to accommodate changes in the operative characteristics of a transmission line which occur as a result of changes in temperature. More particularly, for any given frequency, network 30a' serves to decrease the series gain when the control voltage indicates that the d-c resistance of the transmission line had decreased and to increase the series gain when the control voltage indicates that the d-c resistance of the transmission line has increased. Similarly, for any given frequency, network 30b' increases and decreases the shunt gain in accordance with increases and decreases in the d-c resistance of the line.

In the present embodiment, series line resistance responsive network 30a' includes a buffer network 40a' having an output resistance which varies as a function of the magnitude of the control voltage from sensor 60. Network 30a' also includes a resistance-reactance network comprising a capacitor 35a, an inductor 36a and a resistor 37a. Together the buffer network and the resistance-reactance network act as an electronically variable voltage divider which controls the fraction of the voltage at voltage sensor output 21c that is applied to voltage driver 23, both as a function of line resistance and as a function of frequency. Thus, line resistance responsive network 30a' varies the frequency dependent series gain of generating means 20 both in accordance with frequency and in accordance with the control voltage established by line sensor 60.

Similarly, shunt line resistance responsive network 30b' includes a buffer network 40b' having an output resistance which varies as a function of the magnitude of the control voltage from sensor 60. Network 40b' also includes a resistance-reactance network comprising a capacitor 35b, an inductor 36b and a resistor 37b. Together, the buffer network and the resistance-reactance network act as an electronically variable voltage divider which controls the fraction of the voltage at current sensor output 26c that is applied to current driver 28, both as a function of line resistance and as a function of frequency. Thus, line resistance responsive network 30b' varies the frequency dependent shunt gain of generating means 25 both in accordance with frequency and in accordance with the control voltage established by line sensor 60.

In view of the foregoing, it will be seen that the frequency dependent series and shunt gains of generating networks 20 and 25, respectively, vary in accordance with the magnitude of a control voltage that is indicative of the a-c losses of a transmission line to provide repeater 13' with an insertion gain exhibiting a frequency dependent gain characteristic which compensates for the frequency dependent attenuation characteristics of non-loaded transmission lines of differing lengths.

a. The Operation Of Line Resistance Sensor 60

Figure 3:
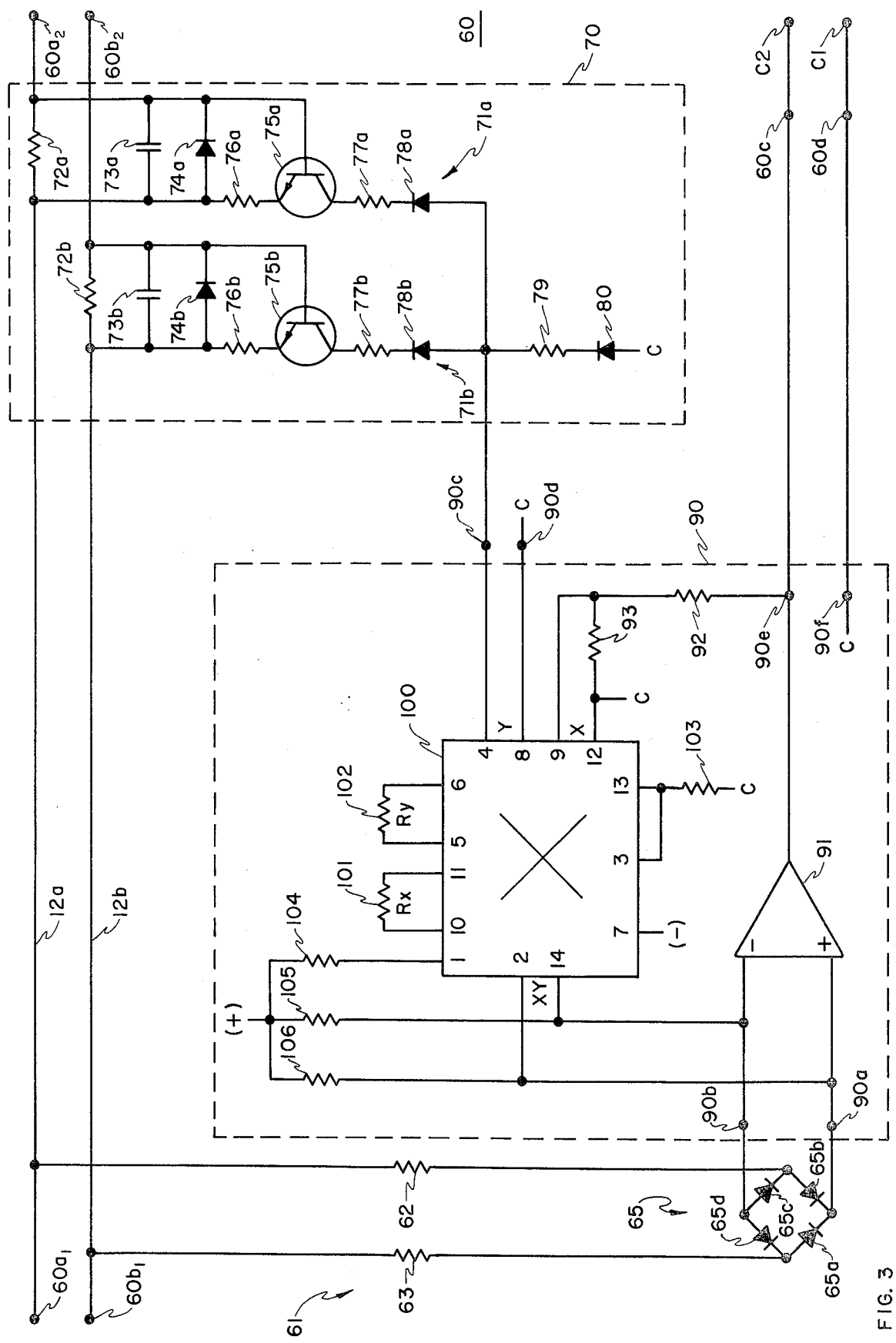
FIGS. 3 through 5 are schematic diagrams of parts of the circuitry shown in block form in FIG. 2.

The operation of line resistance sensor 60 will now be described. To the end that line resistance sensor 60 may establish, between terminals C1 and C2 thereof, a voltage which is proportional to the d-c resistance and, therefore, the a-c losses of the transmission line, there is provided therein, as shown in FIG. 3, a voltage sensing network 61, a current sensing network 70, and an analog dividing network 90 having first input terminals 90a and 90b, second input terminals 90c and 90d, and output terminals 90e and 90f. Voltage sensing network 61 establishes, at input terminals 90a and 90b of divider 90, a current the magnitude of which is proportional to the voltage across the transmission line. Current sensing network 70 establishes, between input terminals 90c and 90d of divider 90, a voltage the magnitude of which is proportional to the current flowing through the transmission line. Analog divider 90 generates, between output terminals 90e and 90f thereof, a voltage which is directly proportional to the current at inputs 90a and 90b and which is inversely proportional to the voltage between inputs 90c and 90d. Since, as previously described, the current at input 90a and 90b is proportional to the line voltage, and since the voltage at input 90c and 90d is proportional to the line current, however, it will be seen that voltage sensing network 61, current sensing network 70, and analog dividing network 90 cooperate to generate, between terminals 60c and 60d, a control voltage which is proportional to the d-c resistance of the transmission line.

It will be understood that in establishing a control voltage proportional to the d-c resistance of a transmission line, the polarity of the voltage across and the direction of the current through that line are not important. As a result, voltage sensing network 61 can be arranged to establish, at first inputs 90a and 90b of analog divider 90, a current the magnitude of which is proportional to the voltage across the transmission line and the direction of which is the same without regard to the polarity of the voltage across that line. Similarly, current sensing network 70 can be arranged to establish, between second inputs 90c and 90d of analog divider 90, a voltage, the magnitude of which is proportional to the current through the transmission line and the polarity of which is the same without regard to the direction of the current flowing through that line.

To the end that voltage sensor 61 may establish, at divider inputs 90a and 90b, a unidirectional current proportional to the voltage across the transmission line, voltage sensor 61 includes voltage sensing resistors 62 and 63 and a rectifying network 65 which here takes the form of a bridge rectifier circuit including diodes 65a, 65b, 65c, and 65d. Rectifier 65 serves to maintain a unidirectional current flow into divider input 90a and out of divider input 90b. Since the magnitude of this current is determined by the resistances of resistors 62 and 63, the magnitude of the current flowing between inputs 90a and 90b is proportional to the magnitude of the voltage across the transmission line. Thus, resistors 62 and 63 and rectifier 65 cooperate to establish, at inputs 90a and 90b of divider 90, a unidirectional current proportional to the voltage across the transmission line.

To the end that current sensing network 70 may establish, between divider inputs 90c and 90d, a voltage the magnitude of which is proportional to the current through the transmission line and the polarity of which is the same without regard to the direction of current flowing through that line, current sensing network 70 includes first and second current gates 71a and 71b, respectively, a resistor 79, and a diode 80. When, on the one hand, line current is flowing through conductor 12a from terminal $60a_2$ to terminal $60a_1$ (e.g., counterclockwise loop current), current gate 71a establishes, through resistor 79 and diode 80, a current the magnitude of which is proportional to that line current. When, on the other hand, current is flowing through conductor 12a in the opposite direction, current gate 71a does not establish any current flow through resistor 79 and diode 80. Thus, current gate 71a is operative only when current in conductor 12a is flowing from terminal $60a_2$ to terminal $60a_1$.

Similarly, when line current is flowing through conductor 12b from terminal $60b_2$ to terminal $60b_1$ (e.g., clockwise loop current), current gate 71b establishes, through resistor 79 and diode 80, a current the magnitude of which is proportional to that line current. When, on the other hand, current is flowing through conductor 12b in the opposite direction current gate 71b does not establish any current through resistor 79 and diode 80. As a result, current gate 71b is operative only when current through conductor 12b is flowing from terminal $60b_2$ to terminal $60b_1$. Thus, for both of the directions in which current may flow through the transmission line, one of the current gates 71a and 71b will establish, at the inputs of divider 90, a single polarity voltage proportional to the current flowing through that line.

Since current gate 71b is structurally and functionally similar to current gate 71a, only current gate 71a will be described in detail herein, and current gate 71b will be understood to operate in a similar manner under similar conditions. In the present embodiment, current gate 71a includes a current sensing resistor 72a, an a-c bypass capacitor 73a, a bypass diode 74a, a transistor 75a, a resistor 76a, a current limiting resistor 77a, and a blocking diode 78a.

When line current flows from terminal $60a_1$ to terminal $60a_2$, it flows through resistor 72a and diode 74a. Under this condition, the forward voltage drop across diode 74a reverse-biases transistor 75a, thereby assuring that that transistor is turned off. Blocking diode 78a prevents current from flowing through the base-collector junction of transistor 75a when the potential of conductor 12a is such that it tends to forward bias that junction. Thus, when current is flowing through conductor 12a from terminal $60a_1$ to terminal $60a_2$, current gate 71a does not establish any significant current through resistor 79.

When, on the other hand, line current flows from terminal $60a_2$ to terminal $60a_1$, diode 74a is reverse-biased and the voltage across resistor 72a is proportional to the line current. If the magnitude of the voltage across resistor 72a is high enough, there will flow through the base-emitter circuit of transistor 75a and resistor 76a a current proportional to the line current. Assuming that transistor 75a is conducting, current will flow from the circuit common C through diode 80, resistor 79, diode 78a, current limiting resistor 77a, the collector-emitter circuit of transistor 75a, and resistor 76a to terminal $60a_1$. If, under these conditions, the resistance of resistor 76a is approximately equal to that of resistor 79, the voltage drop across resistor 76a and the base-emitter circuit of transistor 75a (which is proportional to the line current) will be approximately equal to the voltage drop across resistor 79 and diode 80. Thus, when current is flowing from terminal 60a₂ to terminal 60a₁, current gate 71a establishes, between divider inputs 90c and 90d, a voltage which is proportional to the line current.

In view of the foregoing, it will be seen that current gates 71a and 71b cooperate to establish, at input 90c–90d of analog divider 90, a voltage proportional to the absolute value to the current flowing through the transmission line.

To the end that analog divider 90 may establish, at the output thereof, a voltage which is directly proportional to the current applied to inputs 90a and 90b thereof and which is inversely proportional to the voltage applied to inputs 90c and 90d thereof, there are provided in divider 90 an operational amplifier 91, an analog multiplier network including an analog multiplier 100, gain control resistors 101 and 102, an output scaling resistor 103, biasing resistors 104, 105, and 106, and a voltage divider network including resistors 92 and 93. Multiplier 100 may comprise any suitable commercially available four-quadrant multiplier such as a Motorola MC1495L multiplier. Although the operation of multiplier 100 and of divider 90 is well known to those skilled in the art, the operation thereof will be described briefly, in order to afford a more complete understanding of the operation of the circuitry of the invention.

Multiplier 100 establishes, through its XY or output terminal pair 2–14, a current which is proportional to the product of the voltage between an X or input terminal pair 9–12 and the voltage between a Y or input terminal pair 4–8. The latter proportionality is primarily determined by gain control resistors 101 and 102 and by output scaling resistor 103. Resistor 101 determines the relative gain contribution of the X input, resistor 102 determines the relative gain contribution of the Y input, and output scaling resistor 103, together with resistors 101 and 102, determine the magnitude of the output current. The multiplier is powered by a suitable positive voltage source (+) connected, through bias resistor 104, to terminal 1 and by a suitable negative voltage source (−) connected to terminal 7. In addition, output terminals 2–14 are preferably biased, by resistors 105 and 106, to have a potential slightly greater than the voltage at terminal 1. Thus, resistors 101–106 cooperate with multiplier 100 to generate, at the XY output thereof, an output current proportional to the product of the voltages at the X and Y inputs.

In the present embodiment, multiplier 100 applies to the input of amplifier 91 a negative feedback current, the magnitude of which varies in accordance with the voltages at its X and Y inputs. The voltage at the X input of multiplier 100 is, in turn, determined by the output voltage of amplifier 91 via voltage divider 92–93, which divider is provided to prevent the saturation of multiplier 100. As previously described, the voltage at the Y input of multiplier 100 is determined by the current in the transmission line.

The above negative feedback current is algebraically summed, at the input of operational amplifier 91, with the current which voltage sensor 61 establishes at divider inputs 90a and 90b, so as to apply, to the input of amplifier 91, a difference current equal to the difference therebetween. Because of the characteristics of amplifier 91, that amplifier generates, at the output thereof, a voltage such that the magnitude of this difference current will ordinarily be substantially equal to zero.

When, for example, the magnitude of the current which voltage sensor 61 applies to inputs 90a and 90b increases (or decreases) the output voltage of amplifier 91 must increase (or decrease), in proportion, in order to establish a feedback current sufficient to maintain a difference current of zero. Accompanying this increase (or decrease) in amplifier output voltage is an increase (or decrease) in the voltage at divider output 90e–90f. Thus, the voltage at divider output 90e–90f varies directly in proportion to the current which voltage sensor 61 applies to divider inputs 90a and 90b.

When, on the other hand, the magnitude of the voltage which current sensor 70 applies between terminals 90c and 90d increases (or decreases) the output voltage of amplifier 91 decreases (or increases) in order to establish a feedback current sufficient to maintain a difference current of zero. Accompanying this decrease (or increase) in amplifier output voltage is a decrease (or increase) in the voltage at divider output 90e–90f. Thus, the voltage at divider output 90e–90f varies inversely in proportion to the voltage which current sensor 70 applies to divider inputs 90c and 90d.

In view of the foregoing, it will be seen that divider 90 establishes, between output terminals 60c and 60d, a voltage the magnitude of which varies directly in proportion to the magnitude of the voltage across the transmision line and which varies inversely in proportion to the magnitude of the current through the transmission line. Thus, line resistance sensor 60 establishes, at the output thereof, a control voltage which is proportional to the d-c resistance of and, therefore, to the a-c losses of the transmission line.

b. The Operation of Buffer Networks 40a' and 40b'

To the end that the magnitude of the above control voltage may vary the magnitude and shape of the frequency dependent series gain exhibited by amplifying voltage generating network 20 there is provided therein, as shown in FIG. 2, a variable output resistance buffer network 40a'. Similarly, to the end that the magnitude of the control voltage may vary the magnitude and shape of the frequency dependent shunt gain exhibited by the amplifying current generating network 25, thee is provided therein, as shown in FIG. 2, a variable output resistance buffer network 40b'. Since buffer network 40b' is substantially identical to and operates in the same manner as buffer network 40a', only network 40a' will be described in detail herein and network 40b' will be understood to operate in a similar manner under similar conditions.

Figure 4:
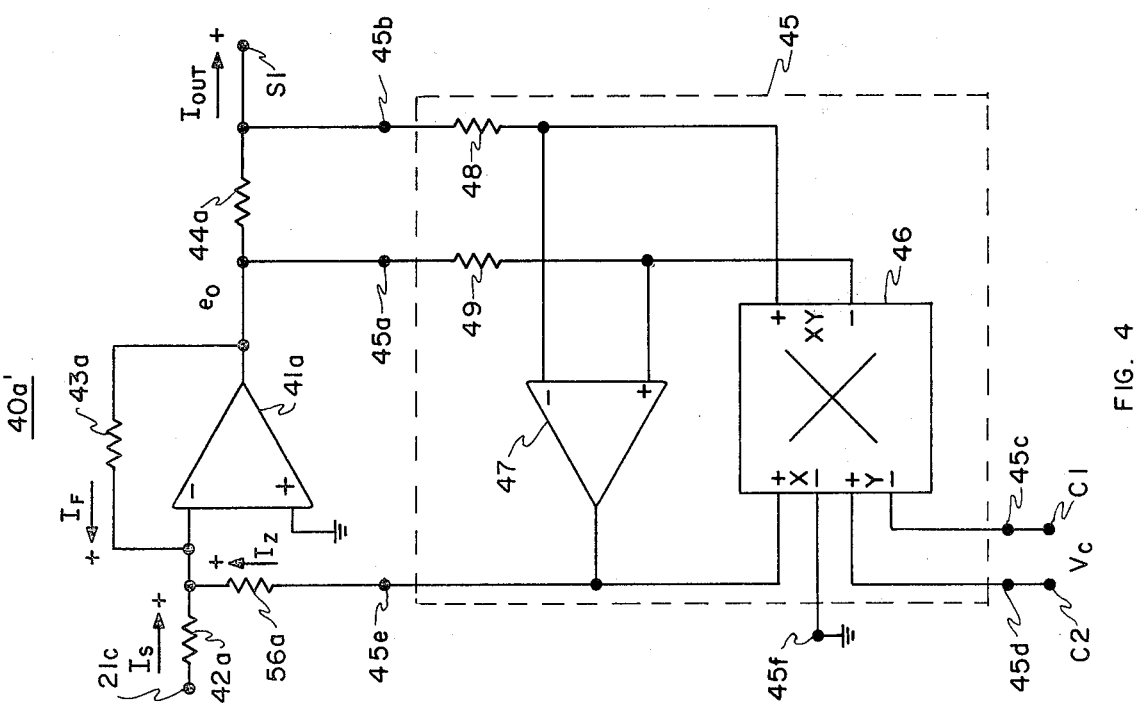

Referring to FIG. 4, there is shown the circuit detail of variable output resistance buffer network 40a'. In the present embodiment, network 40a' includes an operational amplifier 41a having an inverting input, a non-inverting input, and an output, a feedback resistor 43a, input resistors 42a and 56a, an output resistor 44a, and an analog dividing network 45 having signal input terminals 45a and 45b, control input terminals 45c and 45d, and output terminals 45e and 45f.

Analog divider 45 establishes, between output terminals 45e and 45f, an output voltage which is proportional to the output current of buffer network 40a' and which is inversely proportional to the magnitude of the control voltage generated by line resistance sensor 60. This output voltage is applied to the inverting input of amplifier 41a to supply the latter with a negative feedback current. Amplifier 41a, in turn, serves to combine the line voltage signal which signal voltage sensor 21 applied to buffer network input 21c with the negative feedback current established by divider network 45. In accordance with one feature of the present invention, divider 45 and amplifier 41a cooperate to combine the line voltage signal applied to input 21c and the line resistance signal applied to inputs C1 and C2, so as to effectively establish, between ground and terminal S1, a signal voltage source, having a voltage which varies in accordance with the voltage which signal voltage sensor 21 applies to input 21c, in series with a variable resistance having a magnitude that varies in accordance with the magnitude of the control voltage between terminals C1 and C2.

To the end that divider 45 may apply the desired negative feedback current to amplifier 41a, divider 45 includes an operational amplifier 47, an analog multiplier 46, and input resistors 48 and 49. Since the operation of divider 45 is similar to the operation of divider 90, which was described in connection with FIG. 3, the operation of divider 45 will not be described again herein. Since, in addition, multiplier 46 is operationally and functionally similar to multiplier 100 which was described in connection with divider 90 of FIG. 3, the biasing, gain-control, and output scaling resistors for multiplier 46 have been omitted from FIG. 4 for the sake of clarity.

In order to describe the characteristics of buffer network 40a', it is desirable to consider the sum of the currents at the inverting input of amplifier 41a. As previously described, the output voltage $V_{45e}$ of divider 45 is proportional to the output current $I_{out}$ of buffer network 40a' and is inversely proportional to the control voltage $V_c$ which line resistance sensor 60 applies to buffer network 40a'. More specifically, $$V_{45e} = I_Z \cdot R_{56a} = \frac{K \cdot I_{out}}{V_c} \qquad (1)$$

Where: $I_Z$ is the negative feedback current, i.e., the output current of divider 45, $R_{56a}$ is the resistance of resistor 56a, and $K$ is a constant of proportionality.

Since the output current of network 40a' is equal to the voltage $V_{R44a}$ across resistor 44a divided by the resistance $R$ of that resistor, it follows that $$I_z = \frac{K \cdot V_{R44a}}{(R44a) \cdot (R56a) \cdot V_c} \qquad (2)$$

In addition, the signal voltage $V_{21c}$ at input terminal 21c serves to apply to amplifier 41a a signal current $I_s$. The latter current has a magnitude equal to $V_{21c}/R_{42a}$ where R42a is the resistance of resistor 42a.

Finally, resistor 43a applies to the inverting input of amplifier 41a, a feedback current $I_f$. The latter current has a magnitude equal to the output voltage $e_o$ of amplifier 41a divided by the resistance R43a of resistor 43a.

As is well known to those skilled in the art, the sum of the currents at the input of an operational amplifier must be equal to zero. As a result, $$I_S + I_Z + I_F = \frac{V_{21c}}{R42a} + \frac{K \cdot V_{R44a}}{(R44a) \cdot (R56a) \cdot V_c} + \frac{eo}{R43a} = 0. \qquad (3)$$

Multiplying both sides of equation 3 by R43a and then substituting for $e_o$ the equivalent voltage $V_{S1} + V_{R44a}$, where $V_{S1}$ is the voltage at terminal S1, equation 3 takes the form $$V_{21c}\frac{R43a}{R42a} + \frac{K(V_{R44a})(R43a)}{(R44a) \cdot (R56a) \cdot V_c} + V_{R44a} + V_{S1} = 0. \qquad (4)$$

By substituting $I_{out}R44a$ for $V_{R44a}$, equation 4 may be rewritten in the form $$V_{S1} = -\frac{R43a}{R42a} \cdot V_{21c} - I_{out}R44a \left[1 + \frac{K \cdot R43a}{(R44a) \cdot (R56a) \cdot V_c}\right]. \qquad (5)$$

Referring to equation 5, it will be seen that looking into network 40a' from terminal S1, buffer network 40a' appears to consist of a voltage source having a magnitude proportional to the signal voltage at terminal 21c in series with a resistance $R_{out}$ having a magnitude equal to $$R_{44a}\left[1 + \frac{K \cdot R43a}{(R44a) \cdot (R56a) \cdot V_c}\right].$$

Thus, buffer network 40a' generates at its output a signal voltage proportional to the signal voltage across the transmission line and establishes, in series with that signal voltage, a variable resistance the magnitude of which varies in accordance with the magnitude of the control voltage generated by sensor 60.

In other words, buffer network 40a' establishes, between terminal S1 and ground, a voltage source the voltage of which varies in accordance with the signal voltage across the transmission line. Since the voltage established by network 40a' is applied to voltage driver 23, it will be seen that there is inserted, in series with the transmission line, an amplifying voltage which varies in accordance with the signal voltage across the transmission line. Thus, the circuit of FIG. 2 can provide signal gain.

In addition, buffer network 40a' establishes, in series with the above voltage source, an output resistance which varies in accordance with control voltage $V_c$ and thereby in accordance with the d-c resistance of the transmission line. This output resistance acts, with capacitor 35a, inductor 36a, and resistor 37a, as a frequency dependent voltage divider network having its ends connected between the above voltage source and ground and having a tap S1 connected to voltage driver 23. As a result, the amplifying voltage which driver 23 causes to be inserted in series with the transmission line varies as a function of the d-c resistance of the transmission line, and as a function of frequency. Thus, the series gain of the circuit of FIG. 2 varies as a function of the d-c resistance of the transmission line and as a function of frequency.

In view of the foregoing, it will be seen that the magnitude of the frequency dependent series gain is determined by the output resistance of network 40a' which resistance is, in turn, determined by the d-c resistance of the line. Similarly, the magnitude of the frequency dependent shunt gain is determined by the output resistance of network 40b' which resistance is, in turn, determined by the d-c resistance of the line. In accordance with the invention, the frequency dependent series gain and the frequency dependent shunt gain interact to establish a frequency dependent insertion gain which combines with the frequency dependent attenuation characteristics of transmission lines of differing lengths to establish relatively flat system frequency response characteristics for each of those transmission lines.

It will be understood that since, as shown in equation 5, buffer network 40a' shifts the phase of the voltage at terminal S1 180° with respect to the voltage at terminal 21c, it may be desirable to compensate for this 180° phase shift. Voltage driver input 23a may, for example, be interchanged with voltage driver input 23b in order to introduce a compensating 180° phase shift. This interchange in driver inputs may be seen in comparing FIGS. 1 and 2.

Referring to equation 5, it will be seen that the output resistance of network 40a' cannot be less than the resistance of resistor 44a even though the magnitude of the control voltage becomes relatively large. If it is desired to establish an output resistance which can assume a value less than the resistance of resistor 44a, this may be accomplished by connecting feedback resistor 43a between the ouput of network 40a', i.e. terminal S1, and the inverting input of amplifier 41a. With resistor 43a connected in this manner, the output resistance of network 40a' becomes equal to $$R44a \times [ \frac{K \cdot R43a}{(R44a) \cdot (R56a) \cdot V_c} ]$$

and can, therefore, assume a value less than R44a.

If it is desirable for a single buffer network to exhibit an output resistance which can vary either positively or negatively, divider 45 may be replaced by a suitable four-quadrant divider, i.e., a divider which establishes a feedback current $I_z$ the sign of which varies both in accordance with the polarity of the voltage at terminals 45a-45b and in accordance with the polarity of the control voltage. Such a four-quadrant divider may include the circuitry shown in FIG. 5. The latter divider will be described in connection with FIG. 7.

Amplifying Type Repeater Having Frequency Independent Gain

The frequency dependent insertion gain provided by the circuitry of FIGS. 1 and 2 is ordinarily not desirable in a repeater which is to be connected to a loaded transmission line. This is because the attenuation provided by loaded transmission lines does not vary significantly as a function of frequency for frequencies in the voice frequency band. Instead, a repeater which is to be connected to a loaded transmission line ordinarily provides a fixed or frequency independent gain which combines with the attenuation characteristic of the transmission line so as to decrease the attenuation of the line while maintaining the desirable frequency response characteristic of that line.

Due to the differing impedances of loaded transmission lines of differing lengths, a repeater having a fixed frequency independent gain which is sufficient to establish a desirable system response (e.g., an overall 6 db loss) for a particular length of loaded transmission line will not establish that same desirable system loss for a different length of loaded transmission line. This is because the attenuation of a voice signal is proportional to the length of a loaded line.

In accordance with another embodiment of the present invention, there is provided an amplifying type repeater having a frequency independent gain the magnitude of which is dependent upon the a-c losses of the transmission line connected thereto. As a result, the repeater is able to establish a desirable system response for each transmission line which is connected to that repeater.

In practicing the invention with loaded lines, the desired frequency independent gain may be provided by a circuit of the type shown in FIG. 2, provided that certain simple modifications are made to that circuit. These modifications will ordinarily include the disconnection of capacitors 35a and 35b and inductors 36a and 36b within line resistance responsive networks 30a' and 30b'. This is because it is the latter elements which impart the previously described frequency dependent characteristics to those networks. It will be understood that in the absence of reactive elements such as 35a and 36a, the output resistances of buffer networks 40a' and 40b' combine with resistances 37a and 37b, respectively, to provide a controllable frequency independent voltage divider action which is similar to the controllable frequency dependent voltage divider action described in connection with the circuit of FIG. 2.

The desired frequency-independent gain adjustment may also be provided by substituting for the above-described frequency-independent line resistance responsive network a line resistance responsive network in which the electronically variable resistance network is connected between ground and tap S1 rather than between sensor output 21c and tap S1. An amplifying-type frequency-independent repeater utilizing this approach is shown in FIG. 6.

Figure 6:
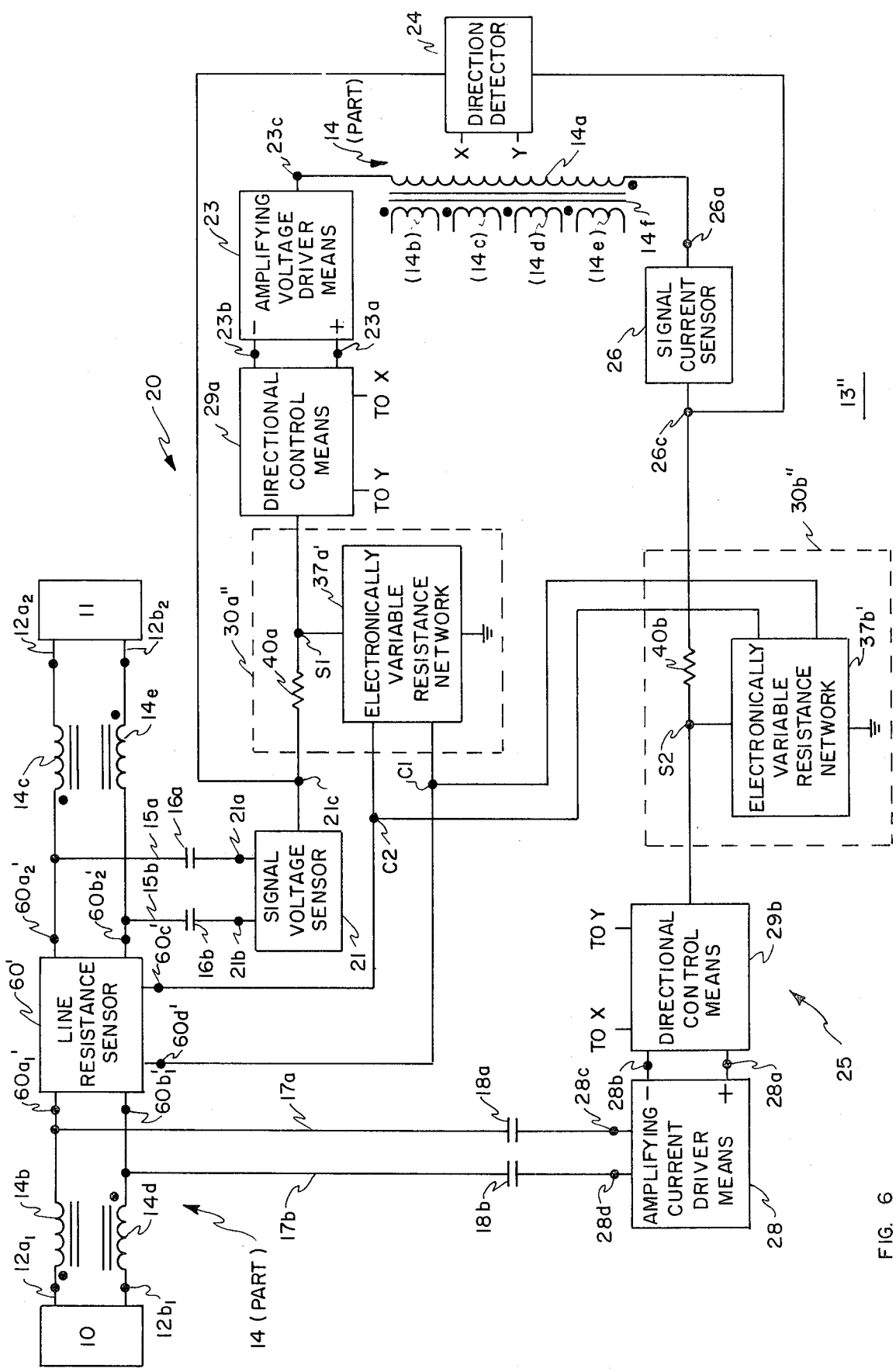
FIG. 6 is a combined block-schematic diagram which illustrates another embodiment of the circuitry of the invention.

The repeater circuit of FIG. 6 is similar to the repeater circuit of FIG. 2 and corresponding parts are similarly numbered. In comparing FIGS. 2 and 6, it will be seen that the principal difference therebetween resides in the fact that, in the circuit of FIG. 2, line resistance responsive network 30a' includes a variable resistance network 40a' between sensor output 21c and tap S1 and a fixed resistance 37a between ground and tap S1 while, in the circuit of FIG. 6, line resistance responsive network 30a'' includes a variable resistance network 37a' connected between ground and tap S1 and a fixed resistance between sensor output 21c and tap S1. The principle of operation of these circuits is, however, the same since varying the resistance of either the upper or the lower part of a voltage divider will vary the voltage at the tap of that voltage divider.

Because of the above-described difference between the location of the electronically variable resistance networks in FIGS. 2 and 6, the manner in which those resistance networks respond to the control voltage generated by line resistance sensor 60 must be different. In the frequency independent form of the circuit of FIG. 2, for example, increases in the resistance provided by network 40a' produce decreases in the amplifying voltages which driver network 23 generates from a given signal voltage from sensor 21. In the circuit of FIG. 6, on the other hand, decreases in the resistance provided by network 37a' produce decreases in the amplifying voltages which driver network 23 generates from a given signal voltage from sensor 21. Thus, in order to produce the same change in series gain, with the same change in control signal from line resistance sensor 60, the resistance produced by network 40a' of FIG. 2 must vary inversely with control voltage $V_c$ while the resistance produced by network 37a' of FIG. 6 must vary directly with control voltage $V_c$. It will be understood that the same relationships hold true for variable resistance networks 40b' and 37b' of FIGS. 2 and 6, respectively.

One additional difference between the circuitry of variable resistance network 40a' of FIG. 2 and variable resistance network 37a' of FIG. 6 results from their differing positions within their respective line resistance responsive networks. This difference resides in the fact that buffer network 40a' is connected in the current path between voltage sensor 21 of FIG. 2 and voltage driver 23 while variable resistance network 37a' is not connected in the current path between voltage sensor 21 of FIG. 6 and voltage driver 23. As a result, variable resistance network 37a' of FIG. 6 need only produce a variable output resistance and need not, in effect, produce a signal voltge source in series with a variable output resistance as does network 40a' of FIG. 2. This differing characteristics are reflected by the utilization of the term "buffer with electronically variable output resistance" for network 40a' of FIG. 2 and the utilization of the term "electronically variable resistance" for network 37a' of FIG. 6.

Figure 8:
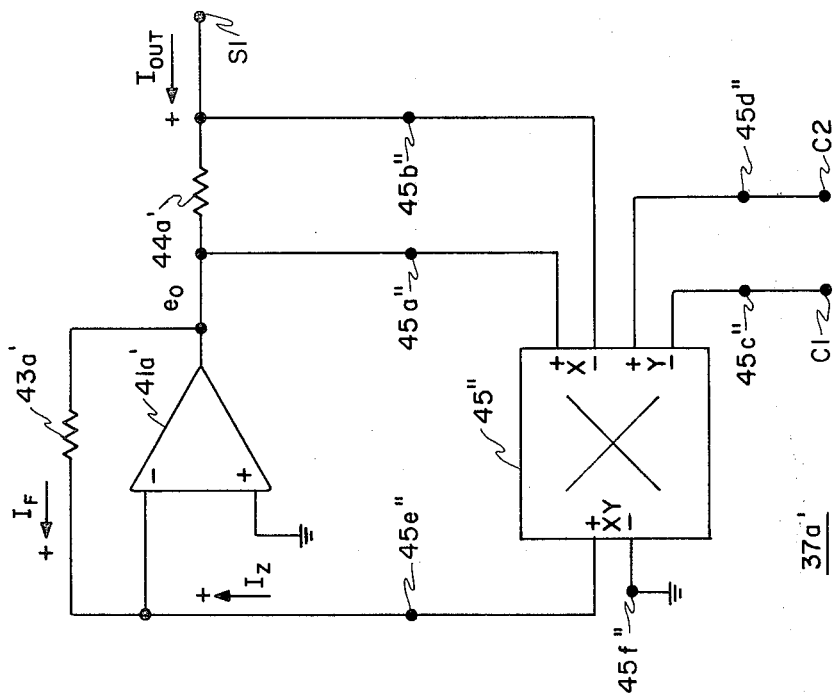
FIGS. 7 and 8 are schematic diagrams of parts of the circuitry shown in block form in the embodiment of FIG. 6.

One exemplary circuit which may be utilized in realizing variable resistance networks 37a' and 37b' of FIG. 6 is shown in FIG. 8. Since variable resistance network 37b' may be realized by circuitry which is structurally and functionally similar to network 37a', only variable resistance network 37a' will be described in detail and network 37b' will be understood to operate in a similar manner under similar conditions.

Referring to FIG. 8, it will be seen that variable resistance network 37a' is similar to buffer network 40a' shown in FIG. 4 and that corresponding elements of FIGS. 4 and 8 are similarly numbered. In comparing FIGS. 4 and 8, it will be seen that buffer network 40a' of FIG. 4 includes an analog dividing circuit 45 while variable resistance network 37a' of FIG. 8 includes an analog multiplying circuit 45''. In other words, variable resistance network 37a' of FIG. 8 may be compared to buffer network 40a' of FIG. 4 wherein the analog divider of network 40a' has been replaced by a suitable analog multiplier. This substitution is desirable since, as previously described, the differing locations of the electronically variable resistance networks require that the resistance produced by network 40a' must vary inversely with control voltage $V_c$ while the resistance produced by network 37a' must vary directly with the control voltage $V_c$. In other words, the substitution of analog multiplier 45'' of network 37a' for analog divider 45 of buffer network 40a' establishes a variable resistance which varies directly in proportion to control voltage $V_c$, rather than a variable resistance which varies inversely in proportion to that control voltage, as is the case with buffer network 40a' of FIG. 4.

In addition, in comparing FIGS. 4 and 8, it will be seen that the inverting input of amplifier 41a of FIG. 4 is connected, through resistor 42a, to voltage sensor output terminal 21c while the inverting input of amplifier 41a' is not connected to voltage sensor output terminal 21c. This removal of a signal input to the inverting input of amplifier 41a' is desirable since, as previously described, the differing locations of the electronically variable resistance networks require that network 40a' produce a signal voltage source in series with a variable output resistance while network 37a' need not produce a signal voltage source in series with a variable output resistance. Thus, the removal of the signal input to the inverting input of amplifier 41a' removes from the output circuit of network 37a' a signal voltage source which is in series with the output resistance.

Due to the above described substitution of analog multiplier 45'' of FIG. 8 for analog divider 45 of FIG. 4 and due to the removal of the signal input to the inverting input of amplifier 41a', variable resistance network 37a' of FIG. 8 establishes, between ground and tap S1 of FIG. 6, a variable resistance, the magnitude of which varies directly in proportion to control voltage $V_c$. As a result, line resistance responsive means 30a'' varies the magnitude of the series gain of amplifying voltage generating means 20 directly in accordance with the magnitude of the control voltage established by sensor 60'. Similarly, line resistance responsive means 30b'' varies the magnitude of the shunt gain of amplifying current generating means 25 directly in accordance with the magnitude of the control voltage established by sensor 60'.

Since, as previously described, the magnitude of the control voltage established by sensor 60' increases and decreases with increases and decreases in the d-c resistance of the transmission line, the magnitudes of the series and shunt gains increase with an increase in the d-c resistance of the transmission line and decrease with a decrease in the d-c resistance of the transmission line. In accordance with the present invention, the series and shunt gains interact so as to establish a frequency independent insertion gain which combines with the frequency independent attenuation characteristics of loaded transmission lines of differing lengths to establish substantially the same system loss for each transmission line connected thereto.

While network 37a' of FIG. 8 and network 40a' of FIG. 4 were described as establishing variable output resistances, networks 37a' and 40a' may also establish variable output impedances. If, for example, it is desirable for network 37a' or 40a' to establish a variable output capacitance, the magnitude of which varies in accordance with the magnitude of control voltage $V_c$, the desired variable output capacitances may be easily provided. In the case of buffer network 40a' of FIG. 4, a variable output capacitance may be established by substituting a suitable capacitor for resistor 44a. Similarly, in the case of network 37a' of FIG. 8, a variable capacitance may be established between terminal S1 and ground by substituting a suitable capacitor for resistor 44a'. In general, a variety of reactances or resistance-reactance networks may replace resistor 44a of FIG. 4 or resistor 44a' of FIG. 8 to provide line resistance-responsive networks including variable impedance networks which are partially or wholly reactive.

As previously described, line resistance sensor 60' of FIG. 6 establishes, between terminals C1 and C2, a control voltage $V_c$ which is proportional to the d-c resistance and, therefore, proportional to the a-c losses of the transmission line. Line resistance sensor 60' may include the circuitry shown and described in connection with FIG. 3. Alternatively, line resistance sensor 60' may comprise the circuitry shown in FIG. 7.

Figure 7:
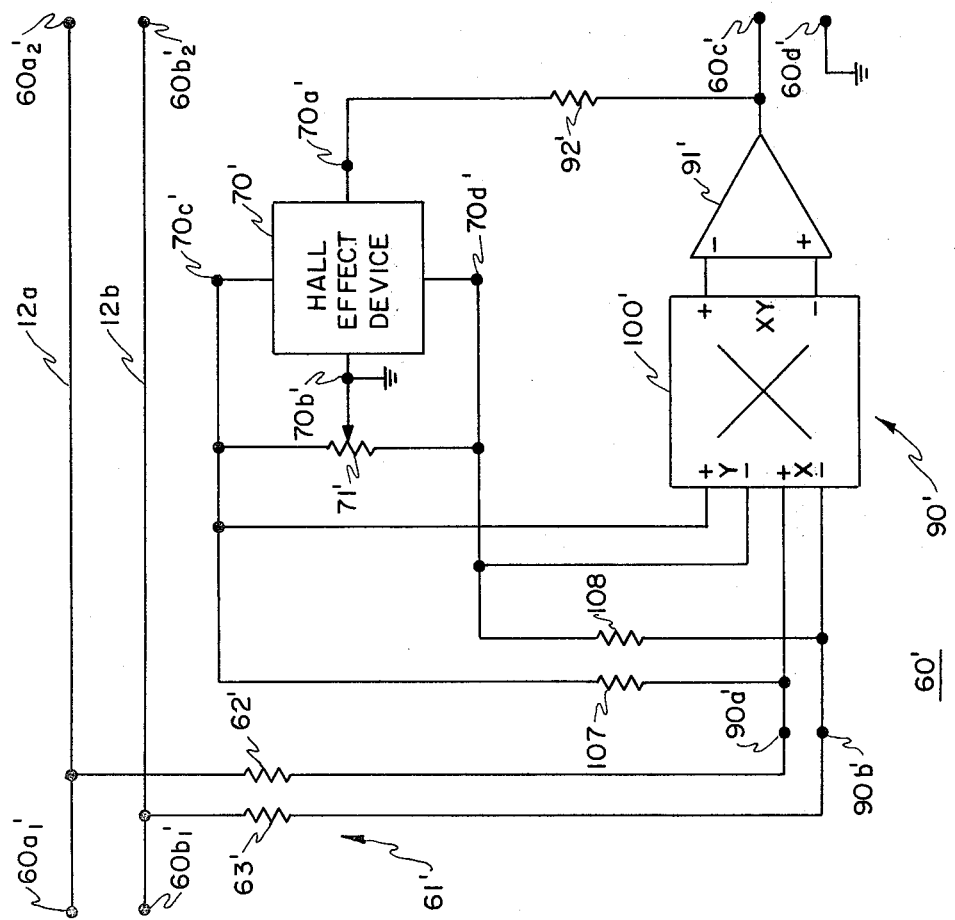

To the end that sensor 60' shown in FIG. 7 may establish, between terminals C1 and C2, a control voltage $V_c$ which is proportional to the d-c resistance of the transmission line, there is provided therein, a voltage sensing network 61', a current sensing network 70', and an analog dividing network 90'. Voltage sensing network 61' estabishes, at inputs 90a' and 90b' of network 90' a current the magnitude of which is proportional to the voltage across the transmission line. Current sensing network 70', shown herein as a Hall-effect device, establishes, between terminals 79c' and 70d' thereof, a voltage the magnitude of which is proportional to the magnitude of the current flowing through the transmission line. Operational amplifier 91', Hall-effect device 70', multiplier 100', and resistors 92', 107, and 108 cooperate to electronically divide the magnitude of the current established by network 61' by the magnitude of the voltage established by Hall-effect device 70'. Since, as previously described, the current established by network 61' is proportional to the line voltage and since the voltage between inputs 90a' and 90d' is proportional to the line current, line resistance sensor 60' establishes, between output terminals 60c' and 60d', a control voltage the magnitude of which is directly proportional to the d-c resistance of the transmission line.

To the end that network 60' may sense the current flowing through the transmission line, there is provided therein a suitable Hal-effect device 70'. As is well known to those skilled in the art, Hall-effect device 70' establishes, between its voltage output terminals 70c' and 70d', a voltage which is directly proportional both to the magnitude of current flowing through its current input terminals 70a' and 79b' and to the magnitude of a magnetic field perpendicular to the direction of that current flow. In the present embodiment, Hall-effect device 90' senses the magnetic flux produced by the current flowing through the transmission line and acts as a multiplier to establish, between terminals 70c' and 70d', a voltage which is the product of a feedback current established by amplifier 91', the magnetic flux produced by the current in the transmission line, and a constant determined by the characteristics of Hall-effect device 90'.

To the end that Hall-effect device 70' may sense the magnetic flux produced by the current through the transmission line, Hall-effect device 70' may be placed in an air gap in transformer core 14f. This location is desirable because the magnetic flux in such an air gap is proportional to the instantaneous current flowing through the transmission line. Thus, Hall-effect device 70' establishes a voltage which is proportional to the current flowing through the transmission line.

In order to compensate for any imperfections in Hall-effect device 70', a potentiometer 71' having its ends connected between terminals 70c' and 70d' and having a tap connected to terminal 70b' and ground may be provided. Potentiometer 71' is preferably adjusted to establish a zero potential between terminals 70c' and 70d' when no magnetic field is applied perpendicular to the current flow between terminals 70a' and 70b'.

To the end that voltage sensing network 61' may sense the instantaneous voltage across the transmission line, network 61' includes sensing resistors 62' and 63' which are connected to conductors 12a and 12b, respectively. Sensing resistor 62' combines with resistor 107 and sensing resistor 63' combines with resistor 108 to form two divider networks having their ends connected between the transmission line and Hall-effect device 70' and having their taps connected to the X input of multiplier 100'. As a result, voltage dividers 62'-107 and 63'-108 establish, at the X input of multiplier 100', a voltage which reflects the difference between a relatively small percentage of the line voltage and a relatively large percentage of the voltage established by Hall-effect device 70'.

Multiplier 100' generates, through its XY output, an output current which is proportional to the product of the difference voltage at its X input and the Hall-effect voltage at its Y input. Amplifier 91' establishes, through resistor 92', a negative feedback current which reduces the magnitude of the difference voltage at the X input of multiplier 100'. As a result, the magnitude of the difference voltage applied to the X input of multiplier 100' will ordinarily be approximately equal to zero.

When, for example, the difference voltage is positive, i.e., when an increase in the difference voltage occurs as a result of a decrease in the Hall-effect voltage or as a result of an increase in the line voltage, the feedback current which the difference voltage causes amplifier 91' to establish through resistor 92' increases, thereby increasing the Hall-effect voltage so as to oppose the increase in the difference voltage. When, on the other hand, the difference voltage is negative, i.e., when an increase in the difference voltage occurs as a result of an increase in the Hall-effect voltage or as a result of a decrease in the line voltage, the feedback current which the difference voltage causes amplifier 91' to establish through resistor 92' decreases, thereby decreasing the Hall-effect so as to oppose the increase in the difference voltage. In other words, amplifier 91' establishes, at output 60c', a voltage which increases with increases in the line voltage and which decreases with increases in the Hall-effect voltage, i.e., establishes a voltage which is directly proportional to the line voltage and inversely proportional to the Hall-effect voltage.

Since, as previously described, the Hall-effect voltage is proportional to the line current, it will be seen that the circuitry of FIG. 7 establishes a voltage which is directly proportional to the line voltage and inversely proportional to the line current. Stated differently, sensor 60' senses the line voltage and the line current and electronically divides the magnitude of the line voltage by the magnitude of the line current to establish, between outputs 60c' and 60d', a voltage which is proportional to the d-c resistance of the transmission line.

Ordinarily in telephone systems, the line current flows in response to the line voltage. As a result, when the line voltage is positive, the line current is also positive and, when the line voltage is negative, the line current is also negative. It will, therefore, be seen that the function of sensor 60' may be served by a dividing network having only a two-quadrant dividing characteristic.

It may be shown, however, that sensor 60' is a dividing network having a four-quadrant dividing characteristic. In other words, the output voltage of sensor 60' will be positive when the inputs are of like signs and will be negative when the inputs are of unlike signs. As a result, the dividing network shown in FIG. 7 is not limited to use in telephone systems, but is usable as a general purpose four-quadrant divider having a voltage input and an input whereby magnetic flux may be applied. Moreover, if it is desired to utilize the circuit of FIG. 7 as a general purpose four-quadrant divider having two voltage inputs, Hall-effect device 70' and its associated resistors may be replaced by any suitable general purpose multiplier.

Figure 5:
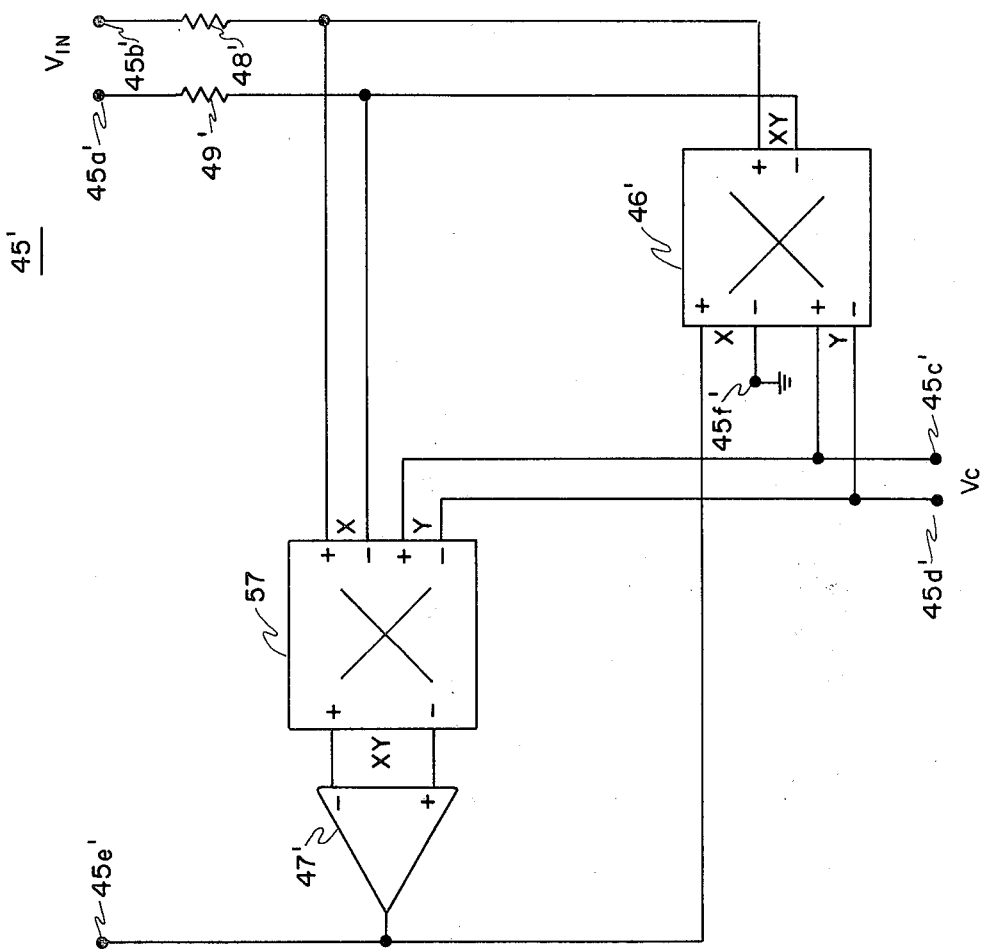

A general purpose four-quadrant dividing network derived from the circuit of FIG. 7 in this manner is shown in FIG. 5 as dividing network 45'. In comparing these Figures, it will be seen that the circuitry of FIG. 7 includes a Hall-effect device 70' and associated resistors 71', 107, and 108 while the corresponding circuitry of FIG. 5 includes a multiplier 46'.

In addition, in comparing FIGS. 5 and 7, it should be noticed that although the Y input of multiplier 100' of FIG. 7 is connected to the output of Hall-effect device 70', the Y input of multiplier 57 of FIG. 5 is connected to the input voltage at terminals 45c' and 45d'. This difference in connection is desirable since the output of multiplier 46' of FIG. 5 has a current source characteristic while the Y input of multiplier 57 of FIG. 5 must be driven from a source having a voltage source characteristic. Alternatively, in order to convert the current output of multiplier 46' into a suitable voltage input for multiplier 57, a voltage divider network having its ends connected between the XY output of multiplier 46' and ground and having a tap connected to the Y input of multiplier 57 may be utilized. Since the above-described differences do not materially alter the operation of dividing networks 45' of FIG. 5 from that described in connection with dividing network 90' of FIG. 7, the operation of dividing network 45' of FIG. 5 will not be described herein in detail.

Impedance Simulating Type Repeaters

Figure 9:
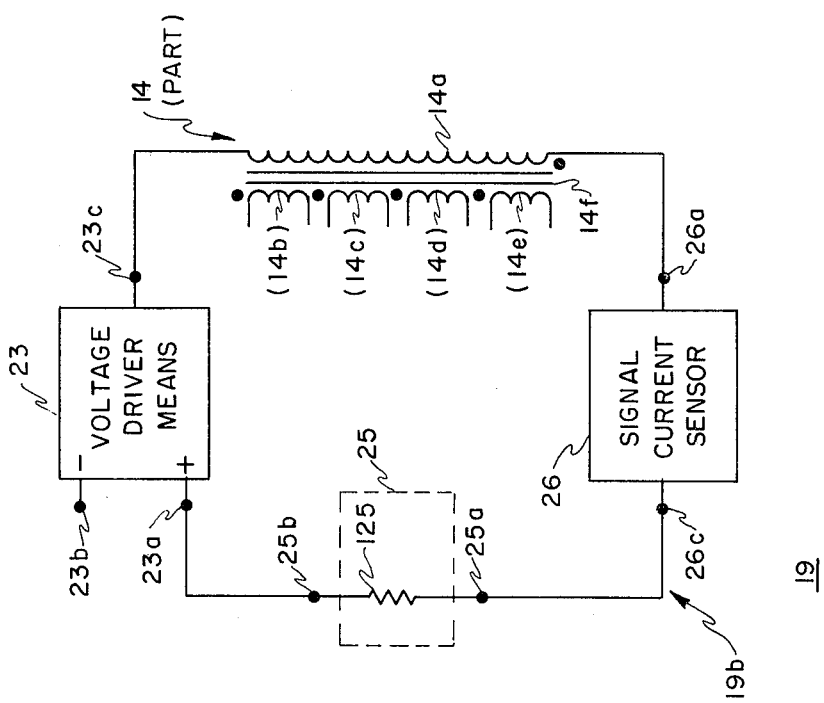
FIG. 9 is a combined block-schematic diagram which illustrates a repeater known to the art.
Figure 9:
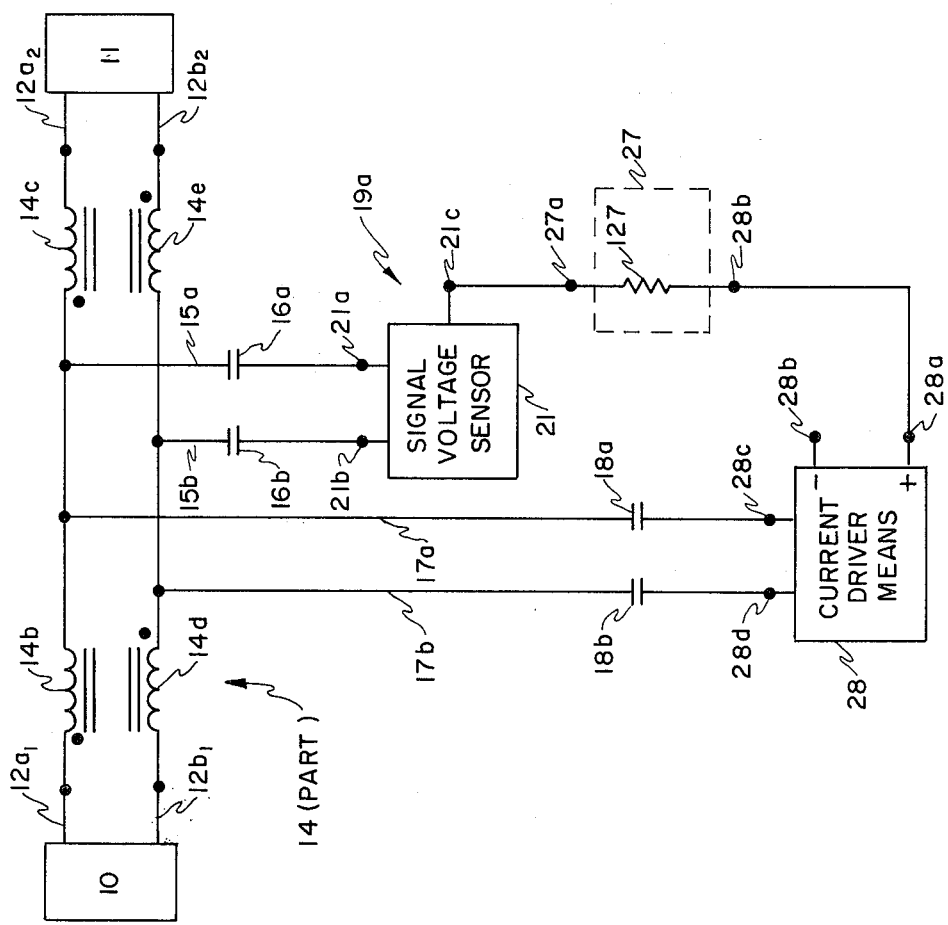

As mentioned previously, repeater circuitry which simulates the presence of negative impedances in series and/or in shunt with the transmission line may provide gain to signals transmitted through a transmission line. A repeater circuit of the above type which was available prior to the present invention is shown in FIG. 9 as an impedance simulating circuit 19 which simulates the presence of one or more negative resistances in series with the transmission line and which simulates the presence of a negative resistance in shunt with the transmission line. Circuitry of the above character is shown and described in the U.S. patent of Charles W. Chambers, Jr., No. 3,828,281, entitled "Impedance Simulating Circuit For Transmission Lines," the disclosure of which is hereby expressly incorporated herein by reference. In order to facilitate an understanding of the present invention, the operation of the circuitry shown in FIG. 9 will be described, briefly, before describing how the structure and operation of that circuitry is modified to afford the present invention.

To the end that impedance simulating type repeater 19 may simulate the presence of a negative resistance in shunt with the transmission line, there is provided therein, as shown in FIG. 9, a shunt impedance simulating network 19a which senses the voltage across the transmission line and inserts, in shunt with the line, a current which simulates the presence of a negative reistance connected in shunt with the line. Shunt impedance simulating network 19a includes a signal voltage sensor 21, feedback means 27, current driver means 28, and coupling capacitors 16a, 16b, 18a, and 18b.

Feedback means 27 serves to determine the magnitude and character of the simulated shunt impedance. If, for example, feedback means 27 includes a resistor 127 as connected in FIG. 9, the simulated shunt impedance will be a negative resistance. In particular, if the resistance of resistor 127 is relatively small, the negative resistance simulated in shunt with the transmission line will be relatively small and if the resistance of resistor 127 is relatively large, the negative resistance simulated in shunt with the transmission line will be relatively large. In other words, the resistance simulated in shunt with the transmission line varies directly in proportion to the resistance of resistor 127. Thus, shunt impedance simulating network 19a generates, in shunt with the transmission line, a variable current which affects signal transmission through that line in the same manner as a negative resistance connected in shunt with the line.

As described in the aforementioned in U.S. Pat. No. 3,828,281, the sign of the simulated shunt resistance is determined by the phase relationship between the input and output signals of shunt impedance simulating network 19a. If, for example, it is desirable to establish a positive resistance in shunt with the transmission line, that desired positive shunt resistance may be simulated by the circuitry of the type shown in FIG. 9 by connecting feedback means 27 between voltage sensor output 21c and inverting input 28b of current driver means 28. In other words, the sign of the shunt resistance simulated by network 19a of FIG. 9 may be changed by introducing a 180° phase shift between the input and output signals of network 19a.

To the end that impedance simulating circuit 19 may simulate the presence of one or more negative resistances in series with the transmission line, there is provided therein a series impedance simulating network 19b which senses the current flowing through the transmission line and inserts, in series with the line, a voltage which simulates the effect of series connected negative impedances. Series impedance simulating network 19b includes a signal current sensor 26, feedback means 25, voltage driver means 23 and a transformer 14 having a primary winding 14a and secondary windings 14b–14c wound on a common core 14f.

Feedback means 25 serves to determine the magnitude and character of the simulated series impedances. If, for example, feedback means 25 includes a resistor 125 as connected in FIG. 9, the simulated series impedances will be a negative resistance. In particular, if the resistance of resistor 125 is relatively small, the simulated negative resistances in series with the line will be relatively large and if the resistance of resistor 125 is relatively large, the simulated negative resistances in series with the line will be relatively small. In other words, the negative resistance simulated in series with the transmission line varies inversely in proportion to the resistance of resistor 125. Thus, series impedance simulating network 19b generates, in series with the transmission line, a variable voltage which affects signal transmission through that line in the same manner as a negative resistor connected in series with the line.

As described in the aforementioned U.S. Pat. No. 3,828,281, the sign of the series resistance simulated by network 19b be changed in a manner similar to that of network 19a. More particularly, the sign of the series resistance simulated by network 19b of FIG. 9 may be changed by introducing a 180° phase shift between the input and output signals of network 19b.

Although a given impedance simulating repeater of the type shown in FIG. 9 may establish a desirable response, e.g., a 6 db loss, for the system including the repeater and a particular length of transmission line, that same repeater is unable to establish that same desirable system response (i.e., a 6 db loss) for a different length of transmission line. This is because the impedance simulating repeater of the type shown in FIG. 9 establishes a fixed gain, e.g., a 3 db gain. As a result, when the gain provided by the repeater is combined with the attenuation characteristic of a particular length of transmission line, the attenuation characteristic of the line is merely decreased by the gain of the repeater. Thus, the impedance simulating type repeater shown in FIG. 9 is unable to establish the same system response for transmission lines of differing lengths.

In accordance with a third embodiment of the circuitry of the invention, there is provided gain control circuitry which automatically varies the gain provided by an impedance simulating type repeater in accordance with the d-c resistance of the transmission line. More particularly, the gain control circuitry of the invention carries the simulated series and shunt resistances of an impedance simulating repeater in proportion to the d-c resistance of the transmission line to provide a substantially constant system for each transmission line connected thereto.

Figure 10:
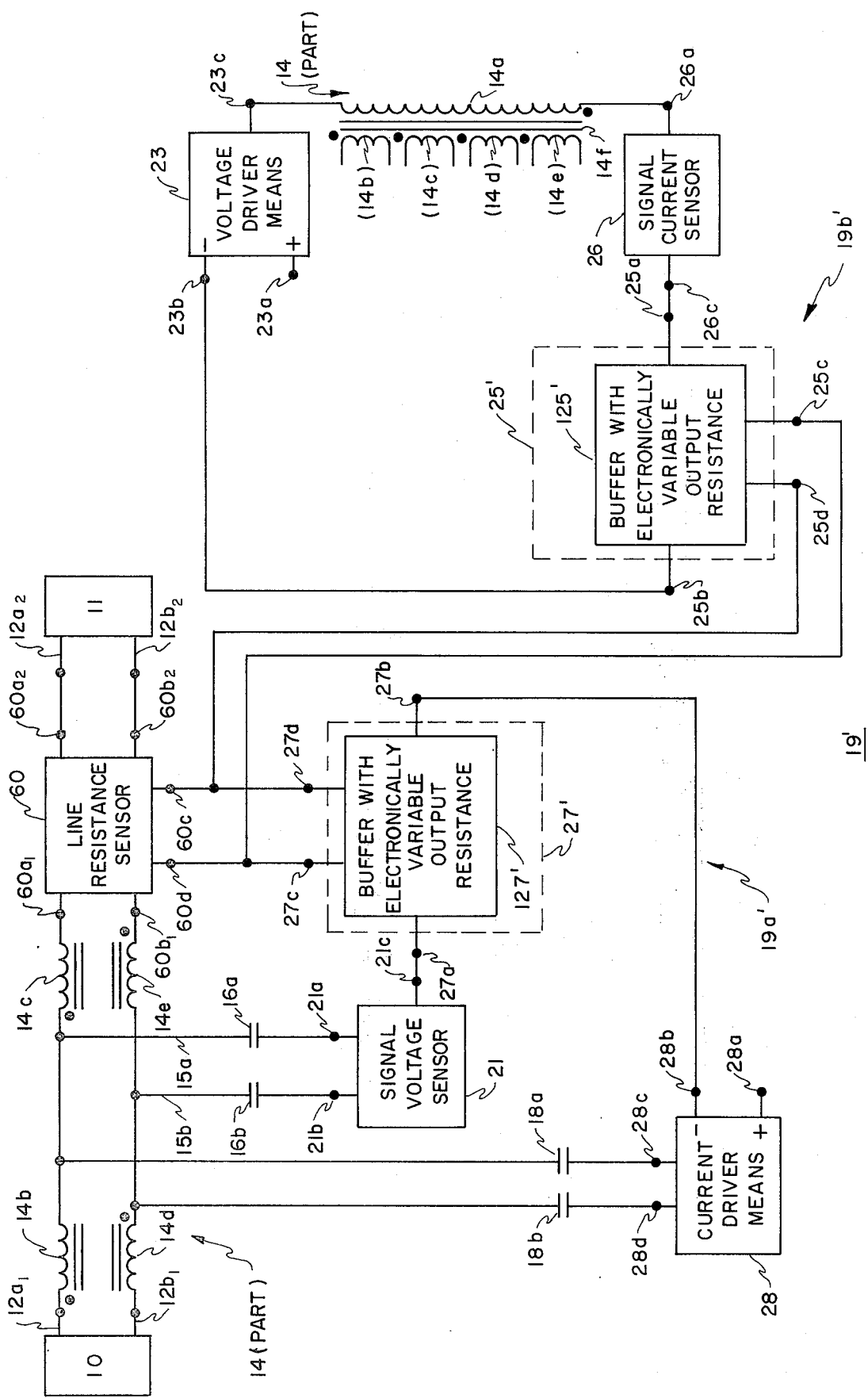
FIG. 10 is a combined block-schematic diagram which illustrates another embodiment of the circuitry of the invention.

Referring to FIG. 10, there is shown an impedance simulating type repeater 19' which simulates the presence of an electronically controllable negative resistance in shunt with the transmission line and which simulates the presence of an electronically controllable negative resistance in series with the transmission line. Impedance simulating circuit 19' of FIG. 10 is similar in many respects to impedance simulating circuit 19 of FIG. 9 and corresponding parts are similarly numbered. In the circuit of FIG. 10, however, gain control circuitry which is conceptually similar to the gain control circuitry of FIG. 2 has been added. More particularly, the circuit of FIG. 10 differs from that of FIG. 9 in that the circuit of FIG. 10 includes a line resistance sensor 60 connected between conductor pairs $12a_1$–$12b_1$ and $12a_2$–$12b_2$ and includes line resistance responsive networks 25' and 27' in the place of feedback resistors 125 and 127. In the present embodiment, line resistance responsive networks 25' and 27' include buffer networks 125' and 127' which have electronically controllable output resistances and which are structurally and functionally similar to buffer network 40a' shown in FIG. 4. Because of this similarity, buffer networks 125' and 127' will not be described herein in detail.

In the circuit of FIG. 10, line resistance sensor 60 serves to generate a control voltage which varies in accordance with the d-c resistance of the transmission line. This control voltage is applied to variable output resistance buffer networks 125' and 127' to vary the simulated series and shunt negative resistances in accordance with the d-c resistance of the transmission line. As a result, an impedance simulating type repeater constructed in accordance with the invention can vary its gain automatically, in accordance with changes in the d-c resistance of a transmission line, and thereby adapt itself for operation in a common mode system in the presence of changes in the temperature of a transmission line of a fixed length.

In order to operate impedance simulating type repeater 19' as a self-adjusting repeater, it is desirable to vary the simulated shunt resistance inversely in proportion to changes in the d-c resistance of the transmission line and to vary the simulated series resistance directly in proportion to changes in that d-c line resistance. By varying the series and shunt negative resistances in the above-described manner, the impedance simulating repeater shown in FIG. 10 establishes a gain the magnitude of which is dependent upon the d-c resistance of the transmission line. As a result, the variable gain provided by repeater 19' combines with the differing attenuation characteristics of different lengths of transmission lines to establish a substantially constant system loss for each transmission line connected thereto.

To the end that the negative resistance simulated in shunt with the transmission line may vary inversely in proportion to changes in the d-c resistance of the transmission line, there is provided in network 19a' variable output resistance buffer 127'. The output resistance established by buffer network 127' varies inversely in proportion to the magnitude of control voltage $V_c$ in a manner similar to buffer network 40a' discussed in connection with FIG. 4. Since, as previously described, the magnitude of the simulated shunt resistance of FIG. 9 varies directly in proportion to the resistance of resistor 127 of FIG. 9, it will be seen that the simulated shunt resistance of FIG. 10 varies directly in proportion to the magnitude of the output resistance of buffer network 127'. As a result of the inverse relationship between the output resistance of buffer network 127' and control voltage $V_c$ and the direct relationship between the simulated shunt resistance and the resistance of network 27, the simulated shunt resistance varies inversely in proportion to control voltage $V_c$. In other words, the magnitude of the simulated shunt resistance varies inversely in proportion to the d-c resistance of the transmission line.

To the end that the negative resistance simulated in series with the transmission line may vary directly in proportion to changes in the d-d resistance of the transmission line, there is provided in network 19b', variable output resistance buffer 125'. The output resistance established by buffer 127' varies inversely in proportion to the magnitude of control voltage $V_c$ in a manner similar to buffer network 40a' discussed in connection with FIG. 4. Since, as previously described, the magnitude of the simulated series resistance of FIG. 9 varies inversely in proportion to the resistance of resistor 125 of FIG. 9, it will be seen that the simulated series resistance of FIG. 10 varies inversely in proportion to the output resistance of buffer network 125'. As a result of the inverse relationship between the output resistance of buffer network 125' and control voltage $V_c$ and the inverse relationship between the simulated series resistance and the resistance of network 25, the simulated series resistance varies directly in proportion to control voltage $V_c$. In other words, the negative resistance simulated in series with the transmission line varies directly in proportion to the d-c resistance of the transmission line.

In view of the foregoing, it will be seen that the negative resistance simulated in shunt with the transmission line varies inversely in proportion to the d-c resistance of the transmission line and that the negative resistance simulated in series with the transmission line varies directly in proportion to that d-c line resistance. As a result of the above-described relationships between the negative series and shunt resistances and control voltage $V_c$, the impedance simulating repeater of FIG. 10 automatically adjusts the gain provided thereby in accordance with the d-c resistance of the transmission line so as to establish a substantially constant system loss for each transmission line connected thereto.

It will be understood that since buffer networks 125' and 127' shift the phase of the voltages at terminals 25b' and 27b' 180° with respect to the voltages at terminals 24d' and 27a', respectively, it may be desirable to compensate for the 180° phase shift. Voltage driver input 23a may, for example, be interchanged with voltage driver input 23b and current driver input 28a may be interchanged with current driver input 28b. These interchanges in driver inputs may be seen in comparing FIGS. 9 and 10.

In view of the foregoing, it will be seen that the circuitry of the invention may be utilized in an impedance simulating type repeater as well as in an amplifying type repeater to establish a substantially constant system loss for each of a variety of transmission lines which may be connected thereto.

It will be understood that the embodiments shown herein are for illustrated purposes only and may be changed or modified without departing from the spirit and scope of the appended claims.

I claim:

1. In an apparatus for modifying the transmission characteristics of a telephone transmission line or the like, the combination of:
   amplifying voltage generating means for generating an amplifying voltage for application to the transmission line;
   amplifying current generating means for generating an amplifying current for application to the transmission line;
   means for applying a signal which varies in accordance with the signal voltage across the transmission line to the amplifying voltage generating means;
   means for applying a signal which varies in accordance with the signal current through the transmission line to the amplifying current generating means;
   means for applying the amplifying voltage generated by the amplifying voltage generating means in series with the transmission line;
   means for applying the amplifying current generated by the amplifying current generating means in shunt with the transmission line;
   control signal generating means for generating a control signal which varies in accordance with the a-c losses of the transmission line;
   the amplifying voltage generating means including first control signal responsive means connected to the control signal generating means, the first signal responsive means exhibiting a controllable impedance which varies in accordance with the control signal and which affects the generation of the amplifying voltage so as to cause the ratio of the amplifying voltage to the signal voltage across the transmission line to vary in accordance with the a-c losses of the transmission line; and
   the amplifying current generating means including second control signal responsive means connected to the control signal generating means, the second signal responsive means exhibiting a controllable impedance which varies in accordance with the control signal and which affects the generation of the amplifying current so as to cause the ratio of the amplifying current to the signal current through the transmission line to vary in accordance with the a-c losses of the transmission line.

2. An apparatus as set forth in claim 1 wherein the control signal generating means comprises line resistance sensing means including:
   line voltage sensing means for sensing the voltage across the transmission line and for establishing a signal that varies in accordance therewith;
   line current sensing means for sensing the current flowing through the transmission line and for establishing a signal that varies in accordance therewith; and
   analog dividing means for generating a control signal proportional to the resistance of the transmission line by electronically dividing the signal established by the line voltage sensing means by the signal established by the line current sensing means.

3. An apparatus as set forth in claim 2 wherein the line current sensing means includes a Hall-effect device for establishing a signal which varies in accordance with the magnetic flux produced by the current in the transmission line.

4. An apparatus as set forth in claim 1 wherein the impedance established by each control signal responsive means varies inversely in accordance with the control signal.

5. An apparatus as set forth in claim 1 wherein the impedance established by each control signal responsive means varies directly in accordance with the control signal.

6. An apparatus as set forth in claim 1 wherein the first control signal responsive means includes first buffer means having a controllable output resistance which varies in accordance with the control signal to vary the ratio of the amplifying voltage to the signal voltage across the transmission line in accordance with the a-c losses of the transmission line, and wherein the second control signal responsive means includes second buffer means having a controllable output resistance which varies in accordance with the control signal to vary the ratio of the amplifying current to the signal current through the transmission line in accordance with the a-c losses of the transmission line.

7. In an apparatus for modifying the transmission characteristics of a telephone transmission line or the like, the combination of:
   amplifying voltage driver means for generating an amplifying voltage for insertion in aiding relationship to a signal transmitted through the transmission line, the amplifying voltage driver means having an input and an output;
   amplifying current driver means for generating an amplifying current for insertion in aiding relationship to a signal transmitted through the transmission line, the amplifying current driver means having an input and an output;
   signal voltage sensing means for sensing the signal voltage across the transmission line;
   signal current sensing means for sensing the signal current through the transmission line;
   means for applying the amplifying voltage at the output of the amplifying voltage driver means in series with the transmission line;
   means for applying the amplifying current at the output of the amplifying current driver means in shunt with the transmission line;

line resistance sensing means for generating a control signal which varies in accordance with the resistance of the transmission line;

a first controllable impedance network responsive to the control signal;

means for connecting the first controllable impedance network to the signal voltage sensing means and to the amplifying voltage driver means to vary the magnitude of the amplifying voltage in accordance with the signal voltage and in accordance with the control signal;

a second controllable impedance network responsive to the control signal; and means for connecting the second controllable impedance network to the signal current sensing means and to the amplifying current driver means to vary the magnitude of the amplifying current in accordance with the signal current and in accordance with the control signal.

8. A circuit as set forth in claim 7 wherein the line resistance sensing means includes, in combination:

line voltage sensing means for sensing the instantaneous voltage across the transmission line and for establishing a line voltage signal which varies in accordance therewith;

line current sensing means for sensing the instantaneous current through the transmission line and for establishing a line current signal which varies in accordance therewith; and analog dividing means for dividing the line voltage signal by the line current signal to establish a control signal.

9. An apparatus as set forth in claim 8 wherein the line current sensing means includes a Hall-effect device to which is applied the magnetic flux produced by the current in the line.

10. An apparatus as set forth in claim 7 wherein each controllable impedance network varies the magnitude of the impedance established thereby inversely in proportion to the control signal.

11. An apparatus as set forth in claim 10 wherein each controllable impedance network includes, in combination:

a network output;

an amplifier having an input and an output;

fixed feedback means for establishing, at the input of the amplifier, a signal which varies in accordance with the voltage at the output of the amplifier;

an analog divider having first and second inputs, the analog divider serving as means for establishing, at the input of the amplifier, a signal which varies directly in proportion to a signal at the first input thereof and which varies inversely in proportion to a signal at the second input thereof;

means for establishing, at the first input of the analog divider, a signal which varies in accordance with the current at the output of the amplifier;

means for connecting the output of the amplifier to the network output; and means for applying the control signal to the second input of the analog divider.

12. An apparatus as set forth in claim 7 wherein each controllable impedance network varies the magnitude of the impedance established thereby directly in proportion to the control signal.

13. An apparatus as set forth in claim 12 wherein each controllable impedance network includes, in combination:

a network output;

an amplifier having an input and an output;

fixed feedback means for establishing, at the input of the amplifier, a signal which varies in accordance with the voltage at the output of the amplifier;

an analog multiplier having first and second inputs, the multiplier serving as means for establishing, at the input of the amplifier, a signal which varies directly in proportion to a signal at the first input thereof and which varies directly in proportion to a signal at the second input thereof;

means for establishing, at the first input of the multiplier, a signal which varies in accordance with the current at the output of the amplifier;

means for connecting the output of the amplifier to the network output; and means for applying the control signal to the second input of the multiplier.

14. An apparatus as set forth in claim 13 further including means for varying, as a function of frequency, the ratio of the amplifying voltage to the signal voltage and for varying, as a function of frequency, the ratio of the amplifying current to the signal current.

* * * * *